`US007715148B2`

(12) United States Patent
Nakakita et al.

(10) Patent No.: US 7,715,148 B2
(45) Date of Patent: May 11, 2010

(54) NEGATIVE PRESSURE SLIDER WITH GROOVE

(75) Inventors: Masaru Nakakita, Niihama (JP); Susumu Takagi, Saijo (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 10/565,284

(22) PCT Filed: Jul. 22, 2004

(86) PCT No.: PCT/JP2004/010792

§ 371 (c)(1),
(2), (4) Date: Jan. 20, 2006

(87) PCT Pub. No.: WO2005/008635

PCT Pub. Date: Jan. 27, 2005

(65) Prior Publication Data
US 2007/0103816 A1 May 10, 2007

(30) Foreign Application Priority Data
Jul. 23, 2003 (JP) .............................. 2003-278063

(51) Int. Cl.
*G11B 5/60* (2006.01)
(52) U.S. Cl. ............... 360/235.6; 360/235.4; 360/235.5
(58) Field of Classification Search ... 360/235.4–235.6, 360/234.3, 235.8–235.9, 236.1–236.4, 236.6–236.9, 360/236, 237
See application file for complete search history.

(56) References Cited

U.S. PATENT DOCUMENTS 4,420,780 A 12/1983 Deckert
5,128,822 A * 7/1992 Chapin et al. ............. 360/236.3
6,021,020 A * 2/2000 Itoh et al. ................. 360/236.1
6,072,662 A * 6/2000 Utsunomiya .............. 360/236.1
6,236,543 B1 * 5/2001 Han et al. ................. 360/236.6
6,483,667 B1 * 11/2002 Berg et al. ................. 360/235.6
6,594,113 B2 * 7/2003 Rao et al. .................. 360/235.8
6,683,755 B2 * 1/2004 Koishi ........................ 360/235.6
2002/0145828 A1* 10/2002 Mundt et al. ............. 360/235.6
2003/0058578 A1* 3/2003 Boutaghou et al. ....... 360/235.8
2003/0165031 A1* 9/2003 Rajakumar ............... 360/235.6
2004/0156143 A1* 8/2004 Kang ...................... 360/235.8
2005/0213252 A1* 9/2005 Park ........................ 360/236.3

FOREIGN PATENT DOCUMENTS

| JP | 06333354 A | 12/1994 |
| JP | 08279133 A | 10/1996 |
| JP | 09330510 A | 12/1997 |
| WO | WO 00/00977 | 1/2000 |

* cited by examiner

*Primary Examiner*—Andrea L Wellington
*Assistant Examiner*—Carlos E Garcia
(74) *Attorney, Agent, or Firm*—Steptoe & Johnson LLP

(57) ABSTRACT

A slider having an improved atmospheric pressure variation characteristic can be provided by ensuring the desired amount of inflow of air flowing to the air bearing surface in a region where it is difficult to ensure the desired air inflow amount, e.g., a region where the slider/disk relative speed is low or a region where the area of the air bearing surface is small by forming a groove configuration surface in a specified shape. In the negative pressure utilization type slider, a groove configuration surface lower in height than an air in flow surface is formed between the disk inner peripheral end and the disk outer peripheral end of the air inflow surface in the air flow incoming end side of a pressure generating surface, separately from a negative pressure generating surface.

33 Claims, 26 Drawing Sheets

F I G. 5
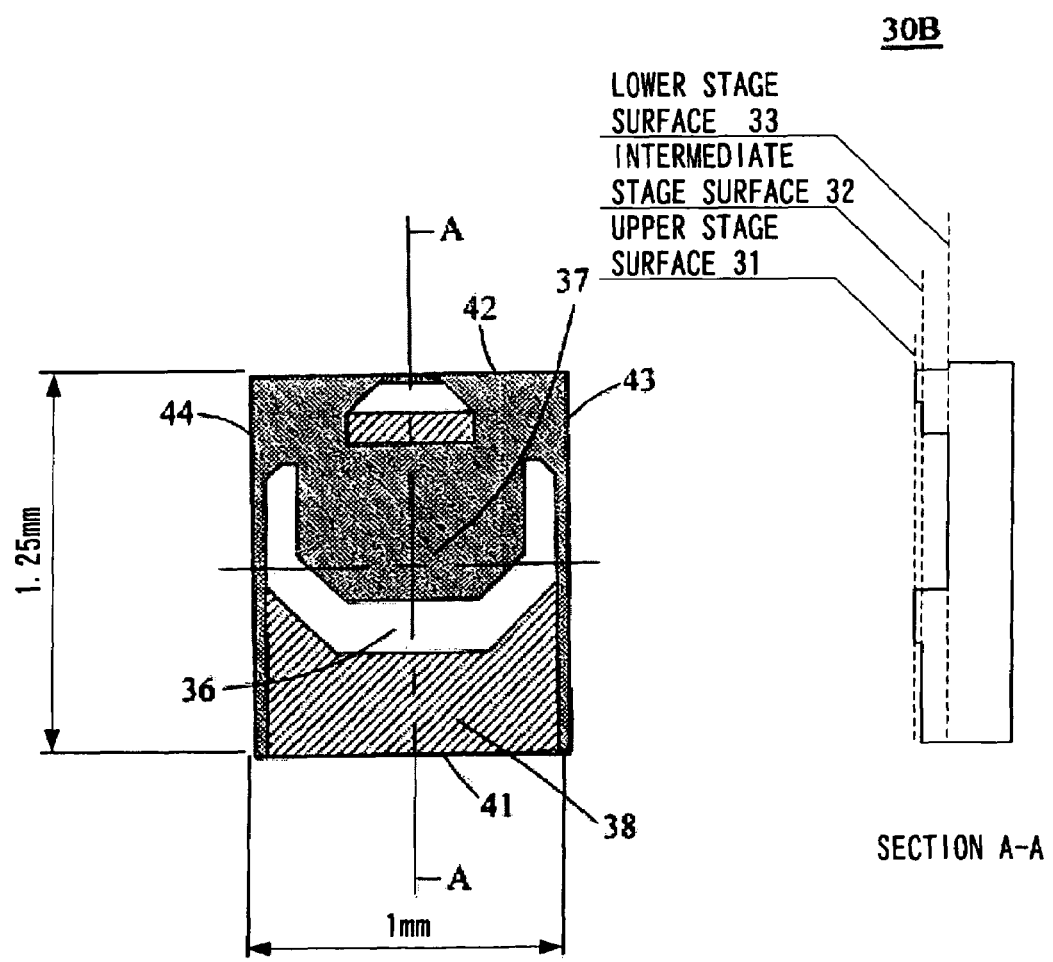

30E

30F

30G

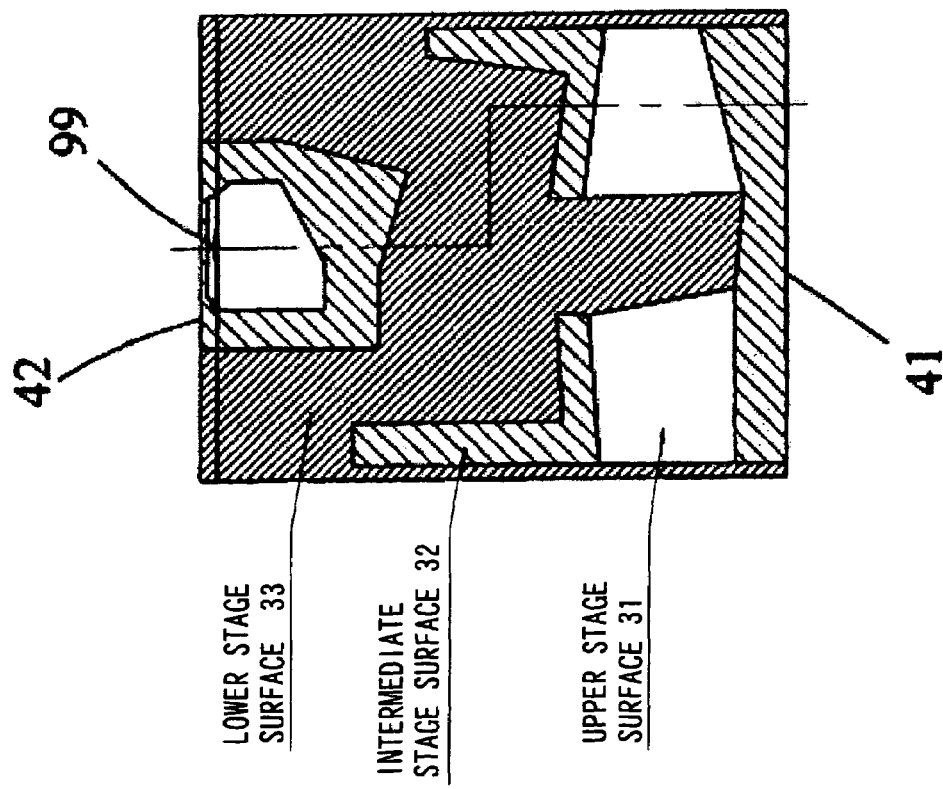

F I G. 2 5
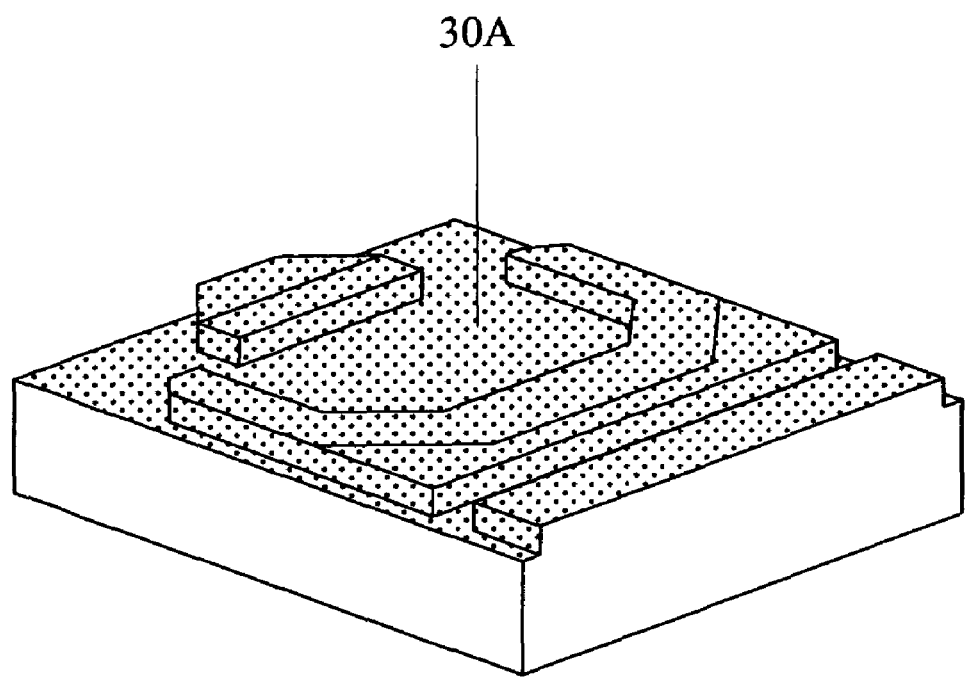

NEGATIVE PRESSURE SLIDER WITH GROOVE

CLAIM OF PRIORITY

This application claims priority under 35 USC 371 to International Application No. PCT/JP2004/010792, filed on Jul. 22, 2004, which claims priority to Japanese Patent Application No. 2003-278063, filed on Jul. 23, 2003, the entire contents of which are hereby incorporated by reference.

TECHNICAL FIELD

The present invention relates to a slider and a data recording disk device and, more particularly, to a slider with an air bearing surface configuration suitable for a data recording disk device in which the slider is supported on a rotary actuator, and to a data recording disk device using the slider. Devices denoted by "data recording disk device" include a device having one of a data recording function and a data reproducing function, and a device having both of these functions.

BACKGROUND ART

In recent years, the data recording density in magnetic disk devices has been remarkably increased. The rate of increase in recording density in magnetic disk devices is said to be 100% per year. With the remarkable increase in data recording density, a quantum leap has been achieved in data recording capacity of magnetic disk devices. The increase in data recording capacity has accelerated the reduction in size of magnetic disk devices, and cost-effective magnetic disk devices have also been made practical which may replace semiconductor memories in various electronic devices such as cameras, facsimile machines, portable telephones, modems, pagers, handheld computers, printing machines and copying machines.

An actuator arm of a magnetic disk device has a slider attached to its distal end, and a read/write magnetic head is incorporated in the slider. The magnetic head is ordinarily placed in the vicinity of an air flow outgoing end of an air bearing surface of the slider facing a disk. An air flow generated with the rotation of the disk is drawn into the gap between the air bearing surface and the disk surface to float the slider above the disk. Thus, the slider floats above the rotating disk. The floating altitude is the thickness of the air lubrication film, i.e., the distance between the disk surface and the slider.

Thus, an air bearing surface is formed in the surface of the slider facing the disk, and a self-pressurizing air lubrication film is formed between the slider and the disk storage surface and is maintained. This film inhibits mechanical contact between the slider and the disk during disk rotation to limit friction and wear.

In magnetic disk devices, the amount of floating of the slider from the disk during recording or reproduction tends to decrease with the increase in recording density. This decrease in the amount of floating is achieved by a negative pressure utilization type of slider in which a slider air bearing surface is formed of a plurality of generally flat surfaces differing in height; a positive pressure is generated at the generally flat surface formed higher so that the gap between the slider and the disk is smaller; and a negative pressure is generated at the generally flat surface formed lower so that the gap between the slider and the disk is larger, and which floats by the positive and negative pressures balancing with each other.

Such a negative pressure utilization type of slider has already been disclosed (see, for example, JP1505878B, JP2778518B, and JP2803639B).

In magnetic disk devices today, a rotary actuator similar to a tone arm of a record player is provided in order to obtain a high access speed. If such a rotary actuator is used, slide between the slider and the disk and the air flow below the slider are no longer unidirectional but widely varying in angle with respect to the longitudinal axis of the slider. Also, the high-speed search operation of the actuator during access acts as a cause of inclination of the direction of slide between the slider and the disk and the direction of the air flow below the slider from the longitudinal axis. Therefore, it is no longer thought that in rotary actuator magnetic disk devices in recent years the sliding direction corresponds to the direction of the longitudinal axis of the slider from the front to the rear or deviates only slightly from the longitudinal axis direction.

The angle of the disk sliding direction with respect to the longitudinal axis of the slider is called a skew angle. When the actuator arm is positioned so that the sliding direction passes through an outer end of the slider or a point outside the slider, the skew angle is positive. When the actuator arm is positioned so that the sliding direction passes through an inner end of the slider or a point at a hub, the skew angle is negative.

When data access is made, the slider is moved through a range from the disk inner periphery to the disk outer periphery. In this movement, the amount of floating of the slider and the floating attitude of the slider are changed, for the reason described below. In the rotary actuator magnetic disk device, not only the relative speed between the slider and the disk but also the skew angle changes with respect to the disk radial position, so that the distribution of the pressure of air produced on the air bearing surface is changed. Due to the change in the amount of floating of the slider, the electromagnetic conversion efficiency of the magnetic head is reduced. It is therefore required that, in a magnetic disk device of which high recording density is required, the amount of floating at the magnetic head position be uniform from the disk inner periphery to the disk outer periphery. With the reduction in the amount of floating of the slider, the requirement with respect to variation in the amount of floating becomes stricter.

In the slider of which constant floating at the magnetic head position is required, there is a risk of the amount of floating being reduced at the minimum-floating-amount position due to a change in the floating attitude of the slider to cause contact between the slider and the disk, i.e., a so-called head crash. Therefore there is a need to maintain the floating attitude of the slider with stability.

FIG. 20 shows an example of an air bearing surface 30. The air bearing surface 30 is fixed in a lower surface of a slider and facing a disk. The air bearing surface 30 is formed in a certain configuration by molding, etching, laser cutting, ion crushing, general-purpose machining or any of other various methods. The air bearing surface 30 is constituted of three flat surfaces forming three stages substantially parallel to each other: an upper stage surface 31, a middle stage surface 32 and a lower stage surface 33. In FIG. 20, the upper stage surface 31 is indicated by a blank area, the middle stage surface 32 by coarse hatching, and the lower stage surface 33 by dense hatching. A head 99 is incorporated on the upper stage surface 31 in vicinity to the air out going end 42. Thus, the air bearing surface is formed in a complicated geometric configuration to limit variation in the disk radius position (variation in relative speed) and to limit the change in the amount of floating and to maintain the floating attitude at the position of the head 99 with the change in the skew angle.

As a background to the air bearing surface configuration becoming complicated, the fact may be mentioned that, in air bearing surfaces in recent years, as shown in FIG. 20, the middle stage surface 32 formed on the air flow incoming end 41 side of the air bearing surface 30 is extended to the air flow incoming end 41 and, therefore, the effect of tapering disclosed in U.S. patents (see, for example, U.S. Pat. Nos. 4,673,996 B, 5,404,256 B and 5,936,800 B) is reduced and the amount of air inflow to the air bearing surface 30 is limited. The arrangement in which the middle stage surface 32 is extended to the air flow incoming end 41 in spite of the reduction in the effect of tapering is adopted for the purpose of limiting the change in the amount of floating due to variation in thickness of a wafer provided as a substrate for the slider. Variation of +/−20 um exists in the wafer thickness. Therefore, if the lower stage surface 33 is formed at the air flow incoming end 41 to obtain the effect of tapering, the length of the lower stage surface 33 formed at the air flow incoming end 41 varies due to variation in the wafer thickness (the length from the air flow incoming end 41 to an air flow outgoing end 42 when the slider is formed). The amount of air inflow is thereby changed largely, resulting in considerable variation in the amount of floating of the slider (see, for example, JP2001-325707A). FIG. 21 is a citation of a diagram of the relationship between variation in substrate thickness and variation in the amount of floating shown in JP2001-325707A. In FIG. 21, symbol ♦ indicates the amount of floating of a slider having a lower stage surface 33 formed at the air flow incoming end 41, and symbol ■ U indicates the amount of floating of a slider having no lower stage surface 33 formed at the air flow incoming end 41. It can be understood from FIG. 21 that variation in the amount of floating of the slider having no lower stage surface 33 formed at the air flow incoming end 41 is markedly improved in comparison with that in the case where the lower stage surface 33 is formed at the air flow incoming end 41. The air bearing surface today is formed in a complicated configuration to improve the floating characteristics of a slider, which are reduced by limitation to the effect of tapering. The formation of such a complicated air bearing surface ensures that working unevenness is limited and that a slider having the desired floating characteristics can be provided.

The configuration of the air bearing surface is ordinarily determined by repeating computation using a special-purpose numerical analysis solver capable of analysis of the amount of floating and the floating attitude of the slider. Each time the design of a magnetic disk device is changed, there is a need to change the design of the air bearing surface configuration according to the disk rotation speed, the skew angle and the amount of floating in the magnetic disk device.

Operations for this kind of design change are time-consuming and the designer needs to have knowledge about fluid dynamics and to be skilled in slider design. In recent years, the recording density has been remarkably increased and the model cycle of magnetic disk devices has become shorter. With these changes, the design cycle of the slider air bearing surface has also become shorter. There is a serious problem that the load on designers is increasing.

Magnetic disk devices using small-diameter disks having diameters of, for example, 27 mm and 20 mm are presently under development. The disk diameter of such magnetic disk devices differs largely from that of the conventional magnetic disk device using a disk having a diameter of, for example, 95 mm or 65 mm. Magnetic disk devices using small-diameter disks are incorporated in portable devices in many cases and those designed to reduce the rotational speed of the spindle motor from the viewpoint of power consumption and noise have been put to practical use. The relative speed between the slider and the disk is therefore increased in comparison with that in the conventional design, so that the desired characteristics ensuring stability of the amount of floating of the slider or air film rigidity for example cannot be obtained as long as the slider design techniques accumulated in the conventional design are used. This is also a cause of an increase in the load on designers. In addition, it is greatly important to consider use of portable devices on high ground, and it is required that the change in the amount of floating of the slider be small with respect to a change in atmospheric pressure. It is extremely difficult to ensure the desired atmospheric pressure variation characteristic in the case of using a smaller disk, since the usable amount of air is reduced in comparison with that in the conventional type.

Further, it is also difficult to ensure the desired slider floating characteristics, including an atmospheric pressure variation characteristic, of sliders of a small air bearing surface area such as femto-type sliders, which are presently being introduced, because the amount of air inflow on the air bearing surface is reduced.

DISCLOSURE OF THE INVENTION

The present invention has been achieved in consideration of these problems, and an object of the present invention is to provide a slider in which an air bearing surface is formed by a predetermined method to achieve an increase in the amount of air inflow while limiting working unevenness, and which has certain slider floating characteristics, particularly reduced atmospheric pressure sensitivity.

To achieve this object, according to the present invention, there is provided a negative pressure utilization type slider having a head for performing recording on a disk or reproducing from the disk, and an air bearing surface 30A formed in a surface facing the disk by a plurality of generally flat surfaces for floating from the disk medium by an air flow caused by the rotation of the disk, the generally flat surfaces differing in height from each other, the air bearing surface 30A having an air in flow surface 38, a positive pressure generating surface 36 and a negative pressure generating surface 37 being formed in this order from the air flow incoming side, wherein the air inflow surface 38 has a groove configuration surface 45 formed from the disk inner peripheral end 43 to the disk outer peripheral end 44 of the air inflow surface, the groove configuration surface being lower in height than the air inflow surface 38.

According to the present invention, the advantageous effect can be obtained to enable designing a slider having reduced changes in the amount of floating due to unevenness of working on the slider, with respect to changes in atmospheric pressure, while limiting the changes in the amount of floating.

As described above, the present invention has the advantageous effect, by forming a groove configuration surface in a specified shape, to ensure the desired amount of inflow of air flowing to the air bearing surface in a region where it is difficult to ensure the desired air inflow amount, e.g., a region where the slider/disk relative speed is low or a region where the area of the air bearing surface is small, and to provide a slider having an improved atmospheric pressure variation characteristic.

Further, an advantageous effect is obtained, by producing a magnetic disk device by using the slider in accordance with the present invention, to provide a magnetic disk device capable of highly reliable operation in high-altitude circumstances.

BRIEF DESCRIPTION OF THE DRAWINGS

FIG. 5 is a diagram showing the configuration of a conventional air bearing surface 30B for comparison with the air bearing surface 30A;

FIG. 20 is a diagram showing the configuration of a conventional air bearing surface 30;

FIG. 25 is a perspective view of a slider 3 showing the air bearing surface 30A.

BEST MODE FOR CARRYING OUT THE INVENTION

Figure 1:
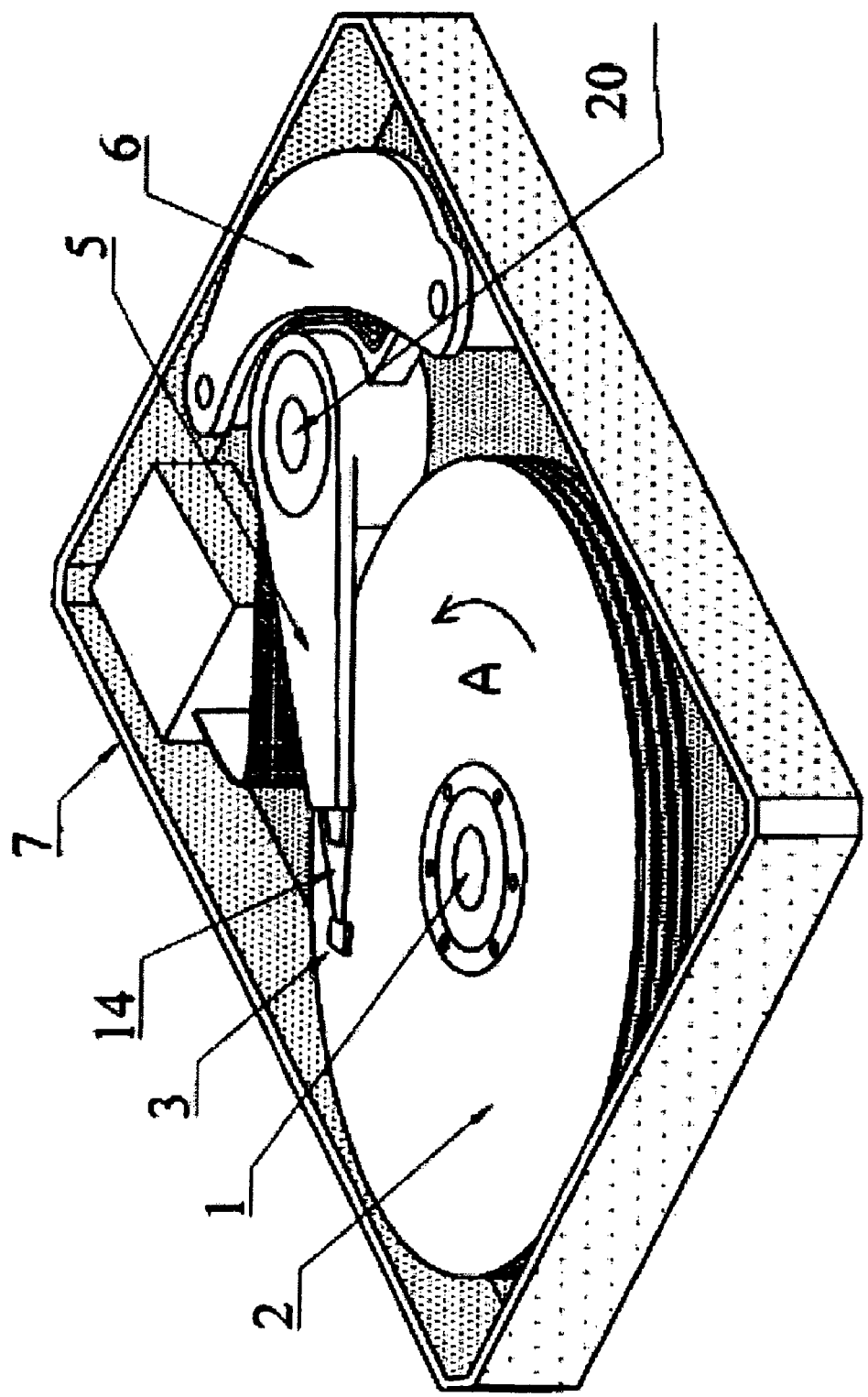
FIG. 1 is a perspective view of a magnetic disk device.

A negative pressure utilization type of slider according to claim 1 of the present invention has a head for performing recording on a disk or reproducing from the disk, and an air bearing surface 30A formed in a surface facing the disk by a plurality of generally flat surfaces for floating from the disk medium by an air flow caused by the rotation of the disk, the generally flat surfaces differing in height from each other, an air in flow surface 38, a positive pressure generating surface 36 and a negative pressure generating surface 37 being formed in the air bearing surface 30A from the air flow incoming side. In this slider, a groove configuration surface 45 lower in height than the air inflow surface 38 is formed in the air inflow surface 38 from the disk inner peripheral end 43 side to the disk outer peripheral end 44 side of the air inflow surface.

A negative pressure utilization type of slider according to claim 2 of the present invention has a head for performing recording on a disk or reproducing from the disk, and an air bearing surface 30A formed in a surface facing the disk by a plurality of generally flat surfaces for floating from the disk medium by an air flow caused by the rotation of the disk, the generally flat surfaces differing in height from each other, an air inflow surface 38, a positive pressure generating surface 36 and a negative pressure generating surface 37 being formed in the air bearing surface 30A from the air flow incoming side. In this slider, a groove configuration surface 45 lower in height than the air inflow surface 38 is formed in the air inflow surface 38 from the disk inner peripheral end 43 side toward the disk outer peripheral end 44 side of the air inflow surface.

A negative pressure utilization type of slider according to claim 3 of the present invention has a head for performing recording on a disk or reproducing from the disk, and an air bearing surface 30A formed in a surface facing the disk by a plurality of generally flat surfaces for floating from the disk medium by an air flow caused by the rotation of the disk, the generally flat surfaces differing in height from each other, an air in flow surface 38, a positive pressure generating surface 36 and a negative pressure generating surface 37 being formed in the air bearing surface 30A from the air flow incoming side. In this slider, a groove configuration surface 45 lower in height than the air inflow surface 38 is formed in the air inflow surface 38 from the disk outer peripheral end 44 side toward the disk inner peripheral end 43 side of the air inflow surface.

If this arrangement is adopted, it is possible to ensure the effect of enabling designing a slider having reduced changes in the amount of floating due to unevenness of working on the slider, with respect to changes in atmospheric pressure, while limiting the changes in the amount of floating.

The best mode of carrying out the present invention will be described with reference to the drawings.

Embodiment 1

Figure 2:
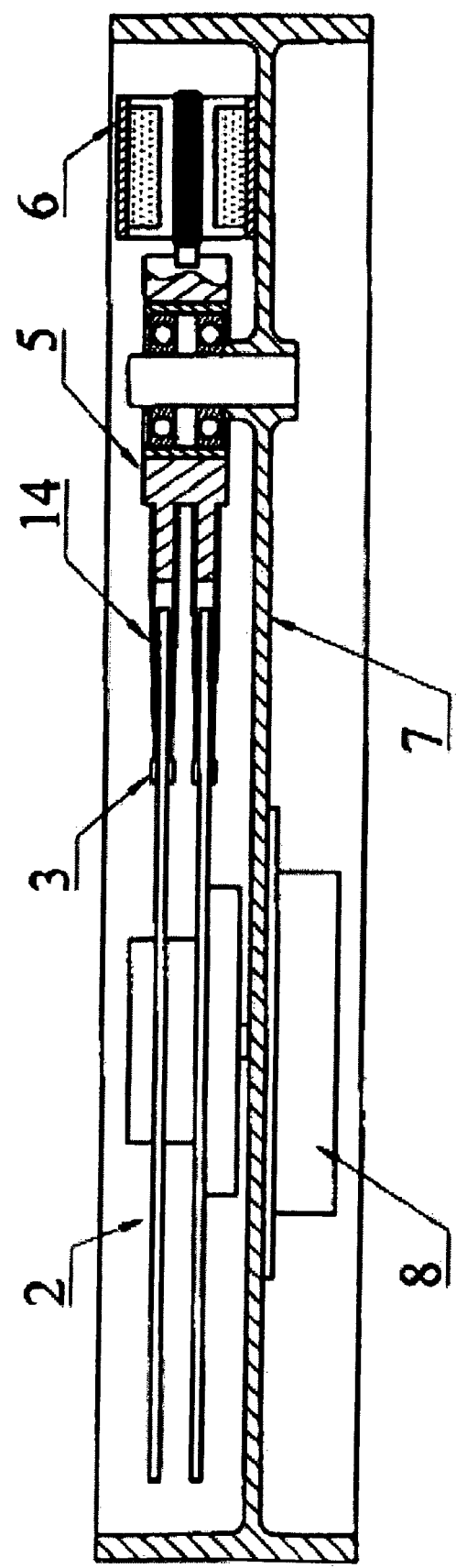
FIG. 2 is a sectional view of the magnetic disk device.

FIG. 1 is a perspective view of internal portions of a magnetic disk device. FIG. 2 is a sectional view of the magnetic disk device. The magnetic disk device is covered with a housing cover (not shown). Suspensions 14 are respectively attached to distal ends of actuator arms 5 rotatably attached to an actuator shaft 20. A slider 3 carrying a magnetism converter or a read/write head 99 (not shown in FIG. 1) is attached to a distal end of each suspension 14.

A spindle 1 is provided in a housing 7. A plurality of disks 2 are rotatably attached to the spindle 1 while being spaced apart from each other. The disks 2 are rotated in a direction of arrow A by the spindle 1 rotated by a motor 8. Information is written to each disk 2 or read from the disk 2 by the head 99 (not shown) existing in the slider 3 and positioned by the actuator arm 5.

A torque is applied to the actuator arms 5 by a voice coil motor 6 to rotate the actuator arms 5 on the actuator shaft 20.

Each slider 3 and the head (not shown) integrally combined with the slider 3 move along the surface of the disk 2 so that a magnetic mark for data can be stored in any track on the disk 2. In the magnetic disk device, this movement of the head is caused by rotation on the actuator shaft 20. The slider 3 and the head in the slider can be positioned at any track on the surface of the disk 2 by rotating the actuator arm 5.

Figure 3:
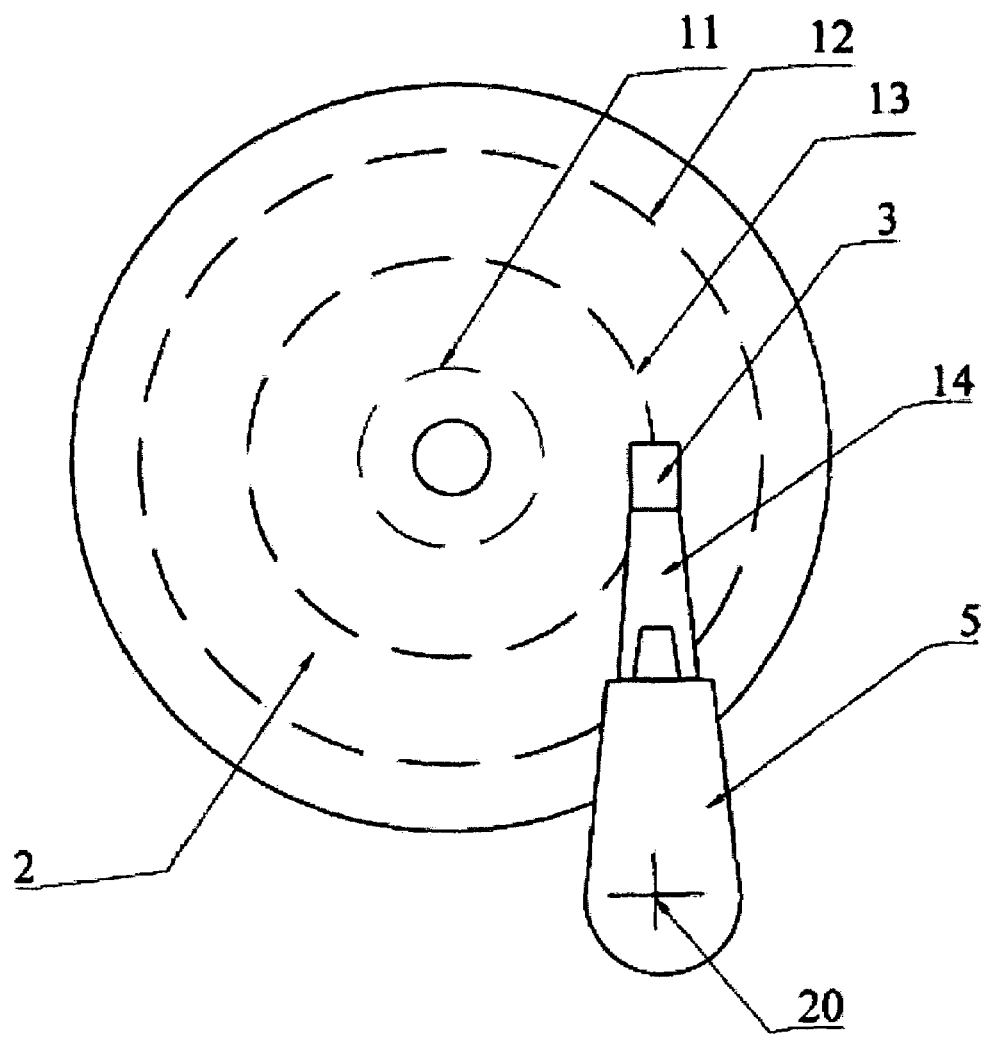
FIG. 3 is a plan view of one of disks 2 seen from above.

FIG. 3 is a plan view of one of the disks 2 seen from above. Concentric tracks in which magnetic information is recorded are provided on each magnetic disk 2, as are those in a well-known technique for magnetic disk devices. An inside diameter (ID) 11 represents the innermost concentric track in which data is recorded. An outside diameter (OD) 12 represents the outermost concentric track in which data is recorded. The direction of sliding on the disk 2 surface with respect to the longitudinal axis of the slider 3 is called a skew angle. The skew angle changes largely between ID 11 and OD 12. Also, the skew angle depends on the position in which the actuator arm 5 is attached to the rotary actuator shaft 20. The screw angle is either positive or negative. When the actuator arm 5 is positioned so that the sliding direction passes through an outer peripheral end 44 of the slider 3, the skew angle is defined as positive. When the actuator arm 5 is positioned so that the sliding direction passes through an inner peripheral end 43 of the slider 32, the skew angle is defined as negative. In FIG. 3, a middle diameter (MD) 13 represents a position at which the skew angle is zero.

In Embodiment 1, the actuator arm 5 of the rotary actuator is places so that the skew angle is maximized at OD 12 and is minimized at ID 11. The radius of OD 12 is 9.6 mm and the skew angle at OD 12 is 7.4 degrees. The radius of ID 11 is 5.0 mm and the skew angle at ID 11 is −19.5 degrees. The radius of MD 13 is 8.0 mm.

Figure 4:
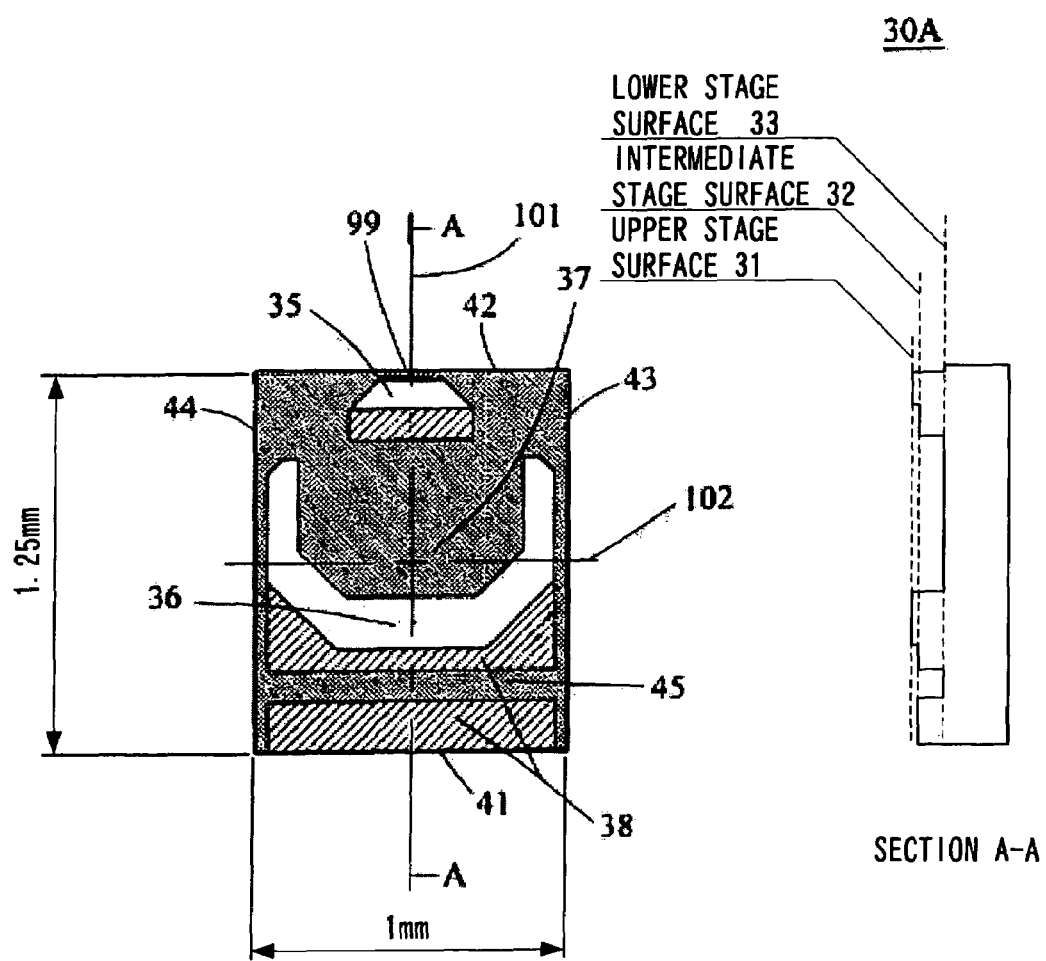
FIG. 4 is a diagram showing the configuration of an air bearing surface 30A in the embodiment in accordance with the present invention.
Figure 26:
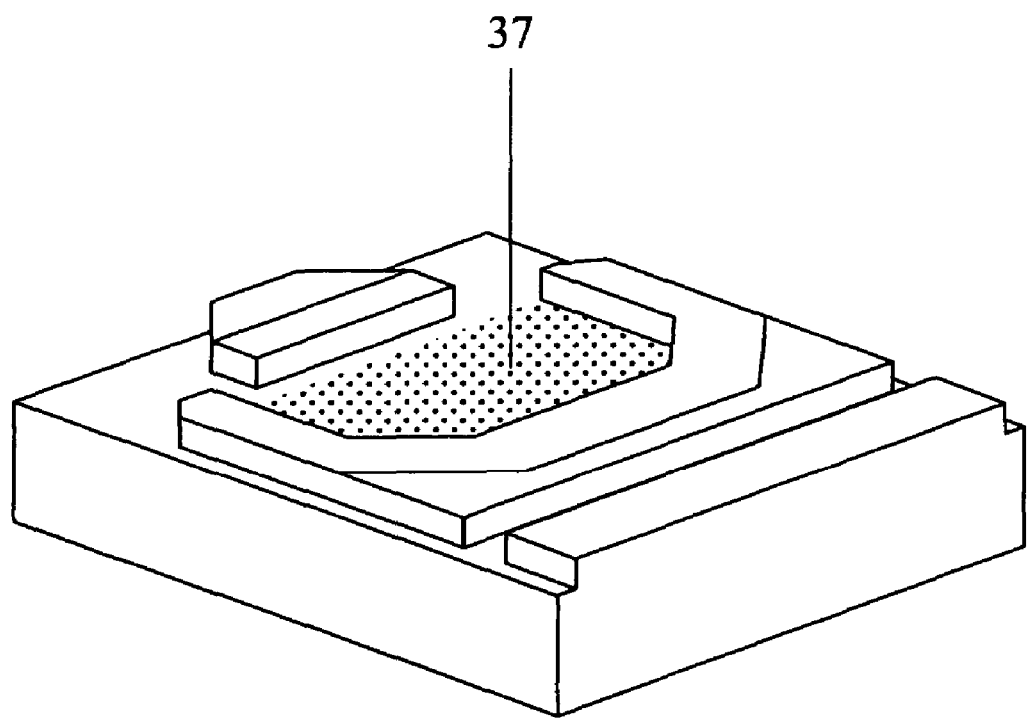
FIG. 26 is a perspective view of the slider 3 showing a negative pressure generating surface 37.

FIGS. 25 and 26 show perspective views of a slider 3 including an air bearing surface 30A of the slider 3 in this embodiment. FIG. 4 shows the configuration of the air bearing surface 30A of the slider 3. In FIG. 25, a hatched area represents the air bearing surface 30A. In FIG. 26, a hatched area represents a negative pressure generating surface 37. The length of the slider in a longitudinal axis 101 direction is 1.25 mm, while the length in a transverse axis 102 direction is 1 mm. The slider is formed in such a size as to be generally called a pico-slider. The air bearing surface 30A is constituted of three flat surfaces forming three stages substantially parallel to each other: an upper stage surface 31, a middle stage surface 32 and a lower stage surface 33. In FIG. 4, the upper stage surface 31 is indicated by a blank area, the middle stage surface 32 by coarse hatching, and the lower stage surface 33 by dense hatching. In Embodiment 1, the difference in level between the upper stage surface 31 and the middle stage surface 32 is 100 nm and the difference in level between the upper stage surface 31 and the lower stage surface 33 is 550 nm.

The air bearing surface 30A is formed by using a dry etching technique so that an air inflow surface 38 formed by the middle stage surface 32 to draw in an air flow to the air bearing surface 30A, a cross rail 36 formed as a positive pressure generating surface by the upper stage surface 31 to generate a positive pressure by the air flow, and the negative pressure generating surface 37 which is formed by the lower stage surface 33 to generate a negative pressure by the air flow, and which is encompassed by the cross rail 36, are formed in this order from the air flow incoming end 41 side. This is a so-called negative pressure utilization type of slider. Also, a pressure generating surface and an air flow outgoing end pad 35 formed by the upper stage surface 31 are formed at an air flow outgoing end 42 to support the head 99 by generating a positive pressure at the air flow outgoing end 42. The air inflow surface 38 is formed by being extended to the air flow incoming end 41 to limit changes in the amount of floating dependent on variation in the length of the air bearing surface 30A in the slider longitudinal axis 101 direction.

Further, in the air inflow surface 38, a groove configuration surface 45 in accordance with the present invention is formed by the lower stage surface 33 from the disk inner peripheral end 43 to the disk outer peripheral end 44. The width of the groove configuration surface 45 is 80 um.

FIG. 5 shows the configuration of a conventional air bearing surface 30B. The construction of the air bearing surface 30B is the same as that of the air bearing surface 30A except that the groove configuration surface 45 is not provided.

The advantages of the present invention will be explained through comparison between an atmospheric pressure variation characteristic of the air bearing surface 30A in accordance with the present invention and that of the conventional air bearing surface 30B.

Figure 6:
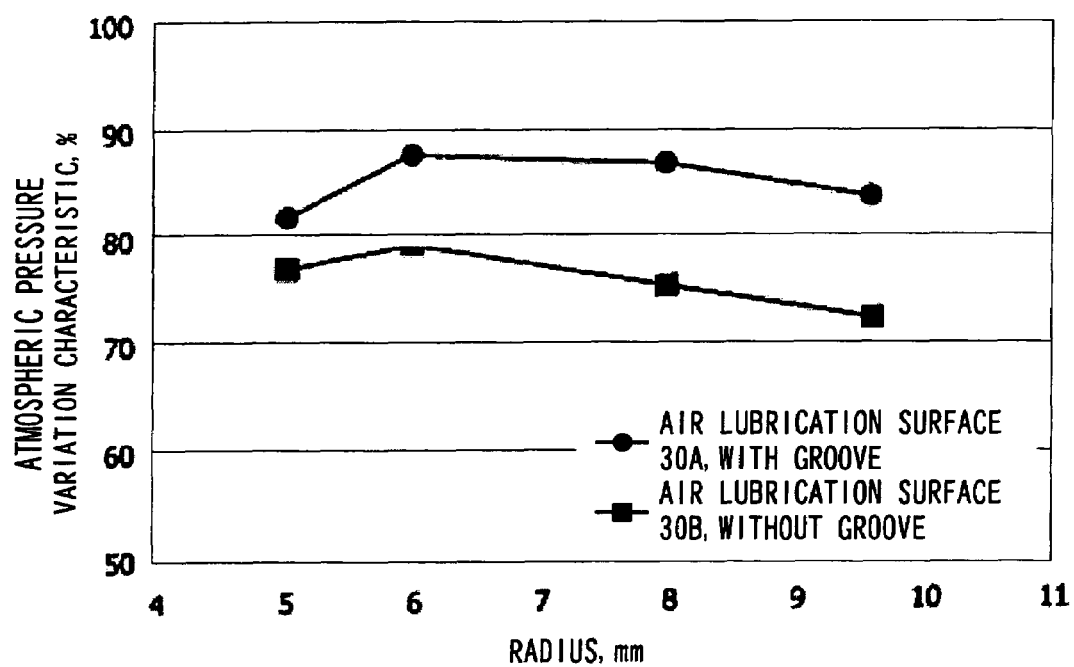
FIG. 6 is a diagram showing comparison between atmospheric pressure variation characteristics of the air bearing surface 30A and the air bearing surface 30B.

FIG. 6 shows the influence of changes in atmospheric pressure on the amount of floating of the slider with respect to the air bearing surface 30A and the air bearing surface 30B. The atmospheric pressure variation characteristic represents a change in the amount of floating of the slider when the magnetic disk device is used on high ground. The atmospheric pressure variation characteristic is ordinarily evaluated by the proportion of the amount of floating of the slider at 10000 feet above the sea level (at about 0.7 atm) to the amount of floating of the slider at 0 m above the sea level (1 atm). If the reduction in the amount of floating is large, there is a possibility of the slider being brought into contact with the disk to cause a head crash. Therefore, the atmospheric pressure variation characteristic is better if the reduction in the amount of floating is smaller, that is, the proportion is larger. Ordinarily, 80% or more is demanded. In this embodiment, 80% or more is ensured as the atmospheric pressure variation characteristic.

FIG. 6 shows the atmospheric pressure variation characteristic from ID 11 to OD 12 with respect to the disk radius position plotted along the abscissa. Referring to FIG. 6, the atmospheric pressure variation characteristic relating to the air bearing surface 30A indicated by symbol ● is significantly higher than 80% through the entire region from LD 11 to OD 12 but the atmospheric pressure variation characteristic relating to the air bearing surface 30B indicated by symbol ■ is lower than 80% in the most of the region from LD 11 to OD 12. This result clearly shows that the air bearing surface 30A is more advantageous than the air bearing surface 30B in terms of the atmospheric pressure variation characteristic through the entire disk surface from ID 11 to OD 12. This may be because the amount of air inflow to the air bearing surface 30A is increased as a result of the provision of the groove configuration surface 45 to such an extent that the amount of air is sufficient for maintaining the desired atmospheric pressure variation characteristic.

The groove configuration surface 45 is formed by the same process as that for forming the configuration of the other surfaces: the upper stage surface 31, the middle stage surface 32 and the lower stage surface 33 in the air bearing surface 30A. The process for forming these surfaces is dry etching in this embodiment. Also, the air inflow surface 38 is extended to the air flow incoming end 41. Therefore, variation in the amount of floating dependent on unevenness of working on the air bearing surface 30A is substantially the same that related to the conventional air bearing surface, and changes in the amount of air inflow and changes in the amount of floating due to variation in the length in the slider longitudinal axis 101 direction are limited. Unevenness of working on the air bearing surface 30A including the groove configuration surface 45, cited here for reference sake, is in such a region as to be difficult to measure through an optical microscope and its value is 1 um or less.

Figure 22:
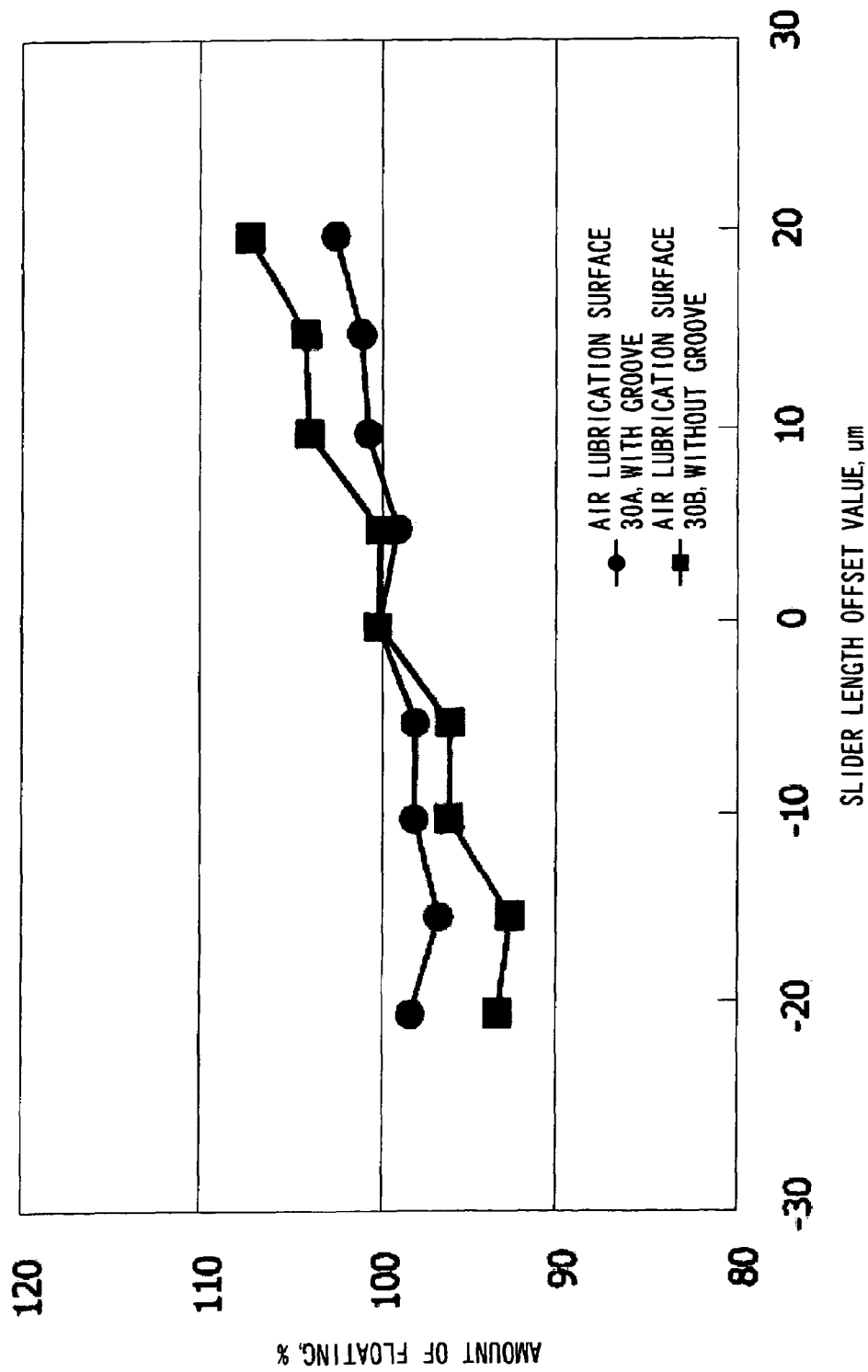
FIG. 22 is a diagram showing comparison between the air bearing surface 30A and the air bearing surface 30B with respect to variation in the slider length and changes in the amount of floating.

FIG. 22 shows changes in the amount of floating in a case where the slider lengths of the air bearing surface 30A and the air bearing surface 30B vary. In FIG. 22, the amount of floating at MD 13 when there is no slider length error is 100%. Symbol ● indicates the result with respect to the air bearing surface 30A, and symbol ■ indicates the result with respect to the air bearing surface 30B. It can be understood from FIG. 22 that the influence of variation in the slider length on the amount of floating is effectively limited in each of the result with respect to the air bearing surface 30A and the result with respect to the air bearing surface 30B. It can also be understood from FIG. 22 that the air bearing surface 30A in accordance with the present invention is effective in limiting variation in the amount of floating in comparison with the conventional air bearing surface 30B. In view of the fact that the amount of air inflow to the air bearing surface is determined by the configuration of the air inflow surface 38, it is inferred as an explanation of the effect of the air bearing surface 30A in accordance with the present invention that, while a change in the length with respect to the entire air inflow surface 38 is reflected in a change in the air inflow amount in the case of the air bearing surface 30B, the air inflow amount depends on the length of the air inflow surface 38 on the positive pressure generating surface 36 side of the groove configuration surface 45 and there is no change in the length of this portion in the case of the air bearing surface 30A. It has been made clear that the performance of the air bearing surface 30A is equal to or higher than that of the air bearing surface 30B at least in terms of variation in the amount of floating dependent on variation in the slider length of the air bearing surface 30A.

In sum, the air bearing surface 30A is capable of increasing the amount of air inflow to the air bearing surface 30A by forming the groove configuration surface 45 in accordance with the present invention, without any deterioration in terms of variation in the air inflow amount, and makes it possible to provide as slider having reduced variation in the amount of floating and having an improved atmospheric pressure variation characteristic.

Figure 7:
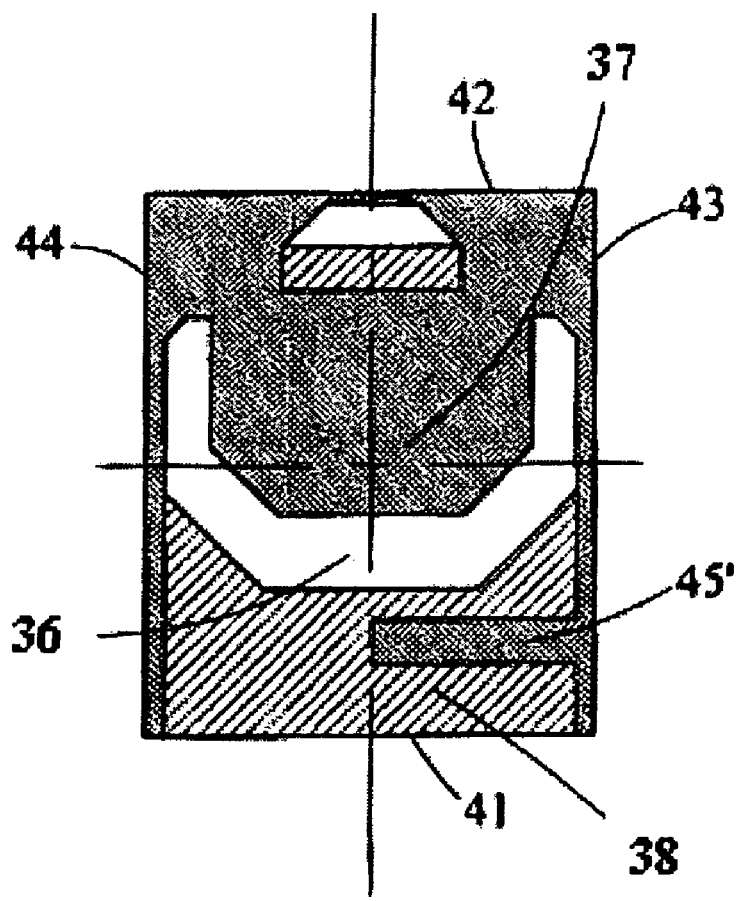
FIG. 7 is a diagram showing the configuration of an air bearing surface 30C in the embodiment in accordance with the present invention.
Figure 8:
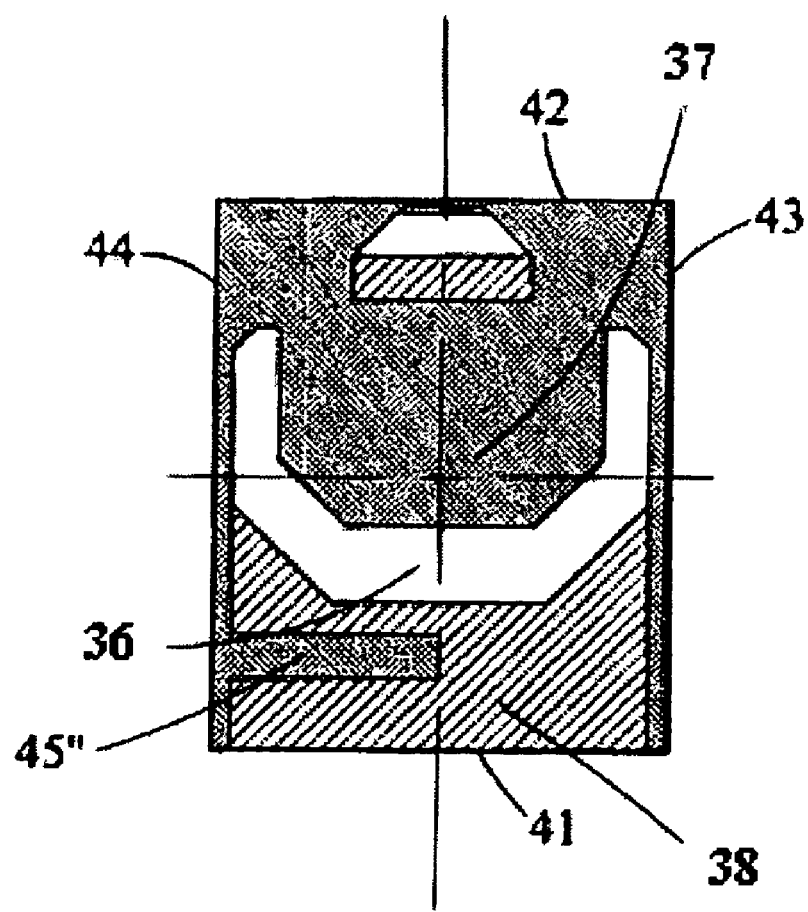
FIG. 8 is a diagram showing the configuration of an air bearing surface 30D in the embodiment in accordance with the present invention.
Figure 9:
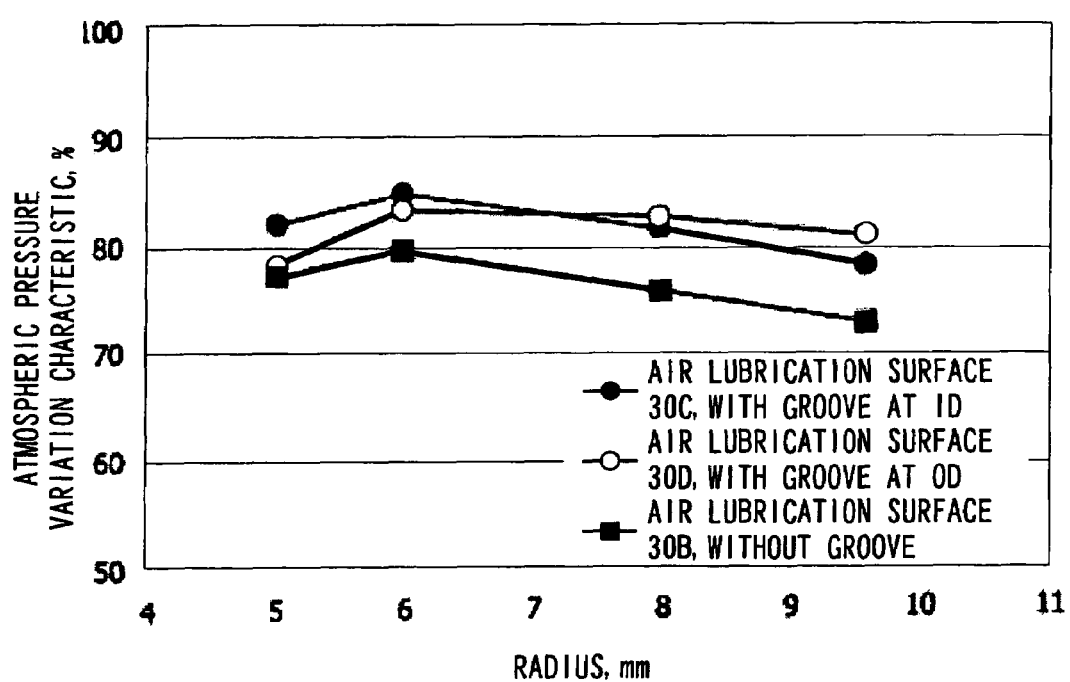
FIG. 9 is a diagram showing comparison between atmospheric pressure variation characteristics of the air bearing surface 30C, the air bearing surface 30D and the air bearing surface 30B.

FIG. 9 shows atmospheric pressure variation characteristics with respect to an air bearing surface 30C shown in FIG. 7 and formed in such a manner that a groove configuration surface 45' is formed in the air bearing surface 30B on the disk inner peripheral end 43 side, and with respect to an air bearing surface 30D shown in FIG. 8 and formed in such a manner that a groove configuration surface 45" is formed on the disk outer peripheral end 44 side, as well as the characteristic in the case of the air bearing surface 30B. In FIG. 9, symbol ● indicates the result with respect to the air bearing surface 30C, symbol ○ indicates the result with respect to the air bearing surface 30D, and symbol ■ indicates the result with respect to the air bearing surface 30B. It can be understood from FIG. 9 that a significant improvement in atmospheric pressure variation characteristic appears mainly at a position closer to ID 11 in the case where the groove configuration surface 45' is provided on the disk inner peripheral end side, while a significant improvement in atmospheric pressure variation characteristic appears mainly at a position closer to OD 12 in the case where the groove configuration surface 45" is provided on the disk outer peripheral end side. That is, it has been made clear that, in improving the atmospheric pressure variation characteristic, forming the groove configuration surface 45 through the air inflow surface 38 between the disk inner peripheral end 43 and the disk outer peripheral end 44, as in the air bearing surface 30A, is not an absolutely necessary condition, and that a groove configuration surface may be formed according to a desired condition, for example, "the groove configuration surface 45' should be formed on the disk inner peripheral end side if the atmospheric pressure variation characteristic is bad at ID 11" or "the groove configuration surface 45" should be formed on the disk outer peripheral end side if the atmospheric pressure variation characteristic is bad at OD 12".

Figure 10:
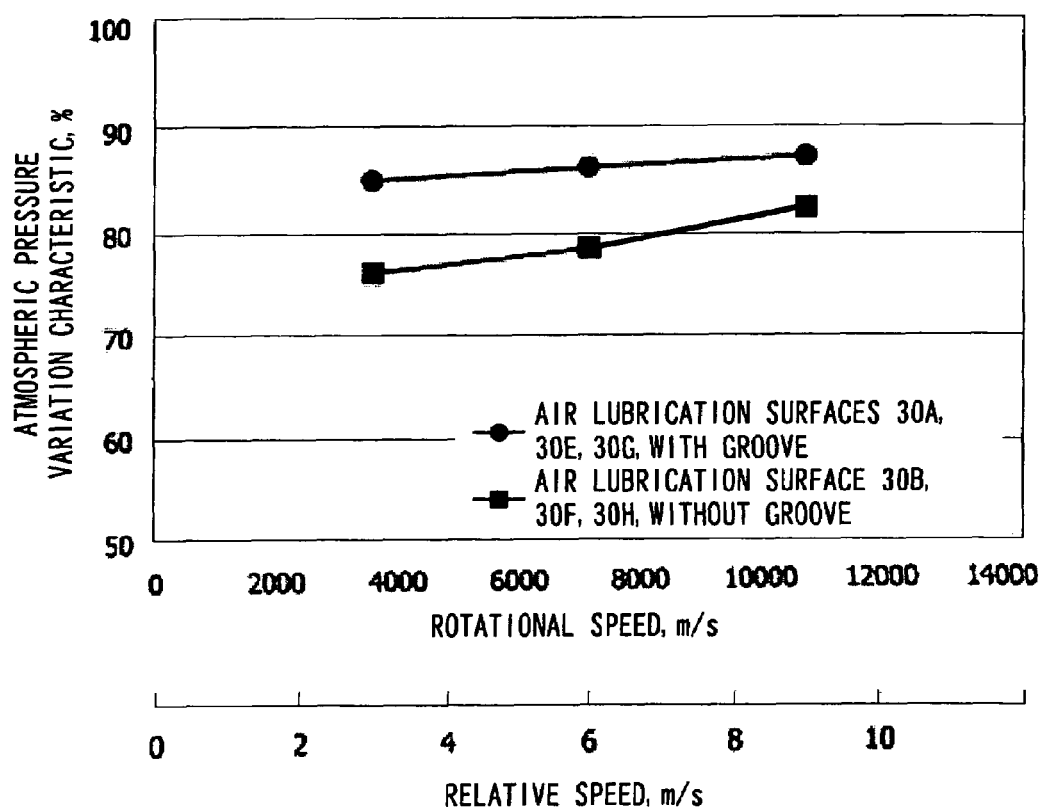
FIG. 10 is a diagram showing a relative speed dependence of the atmospheric pressure variation characteristic.
Figure 11:
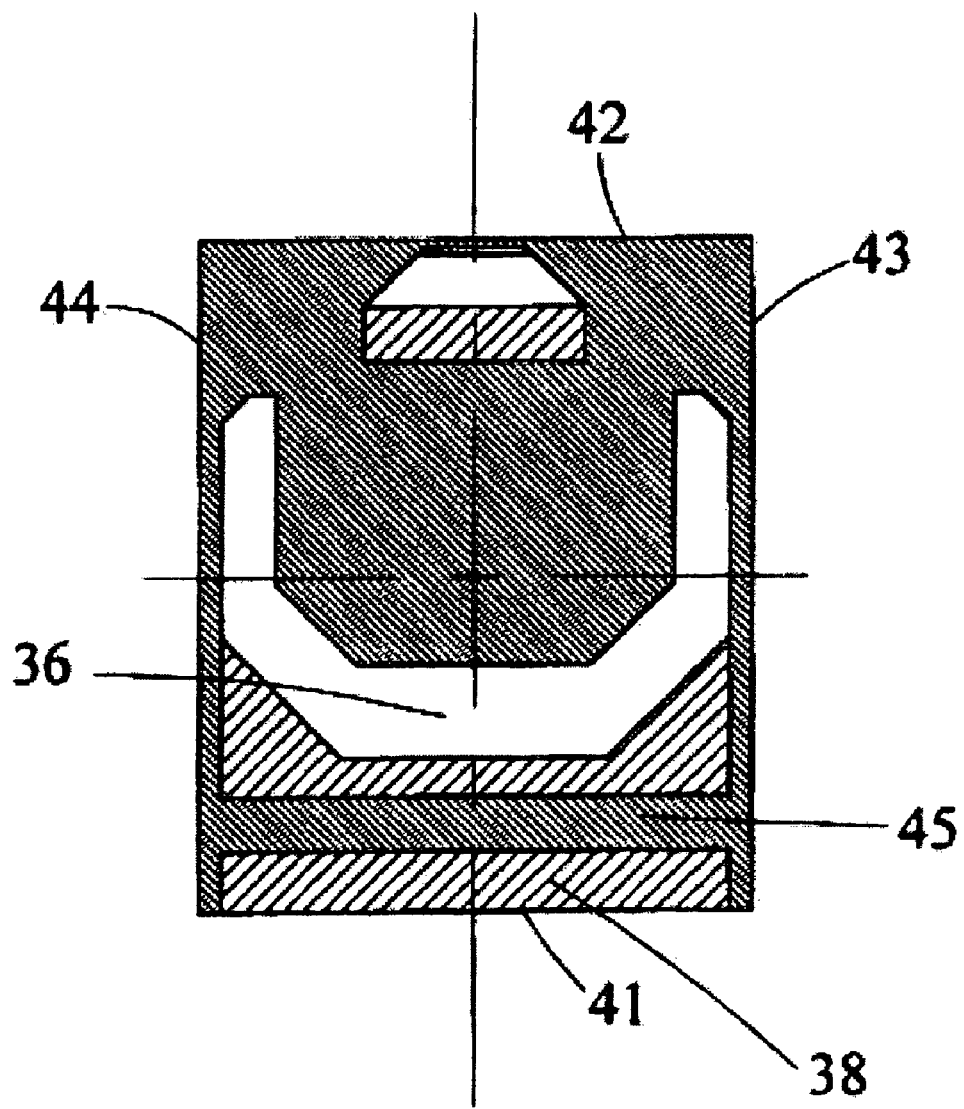
FIG. 11 is a diagram showing the configuration of an air bearing surface 30E.
Figure 12:
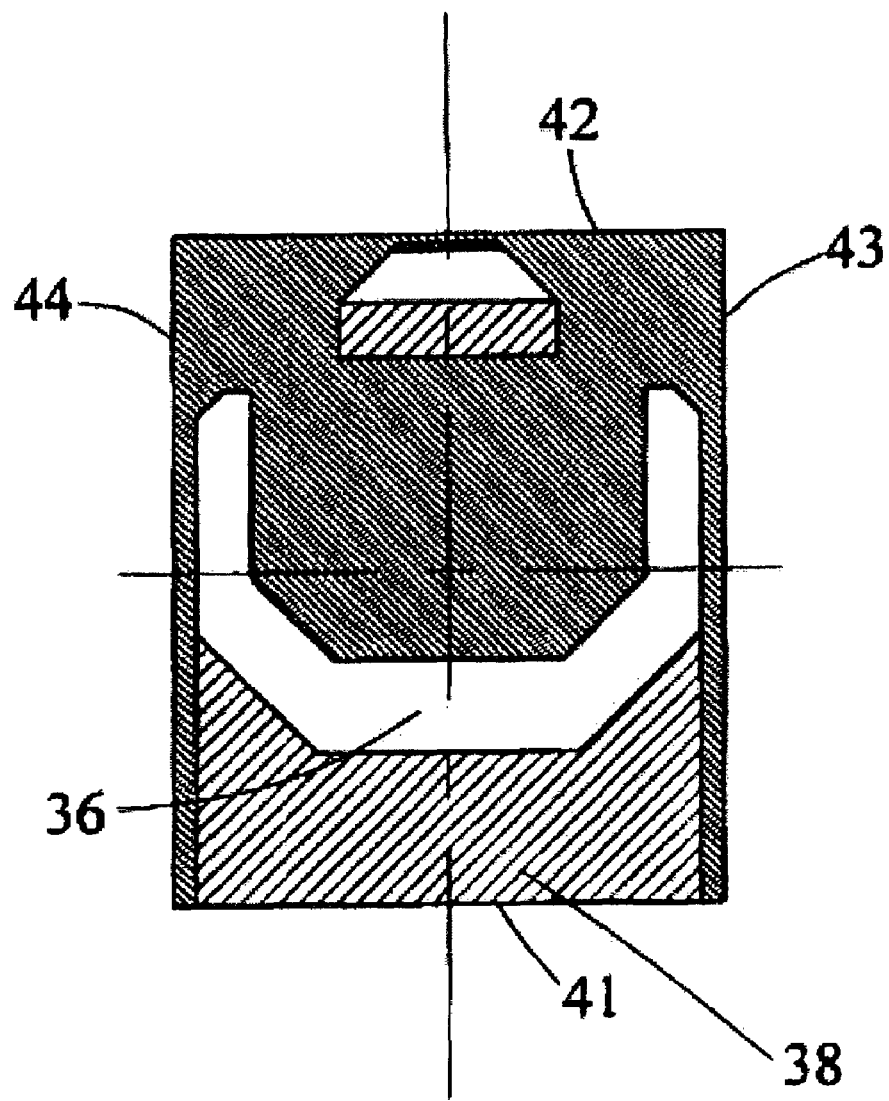
FIG. 12 is a diagram showing the configuration of an air bearing surface 30F.
Figure 13:
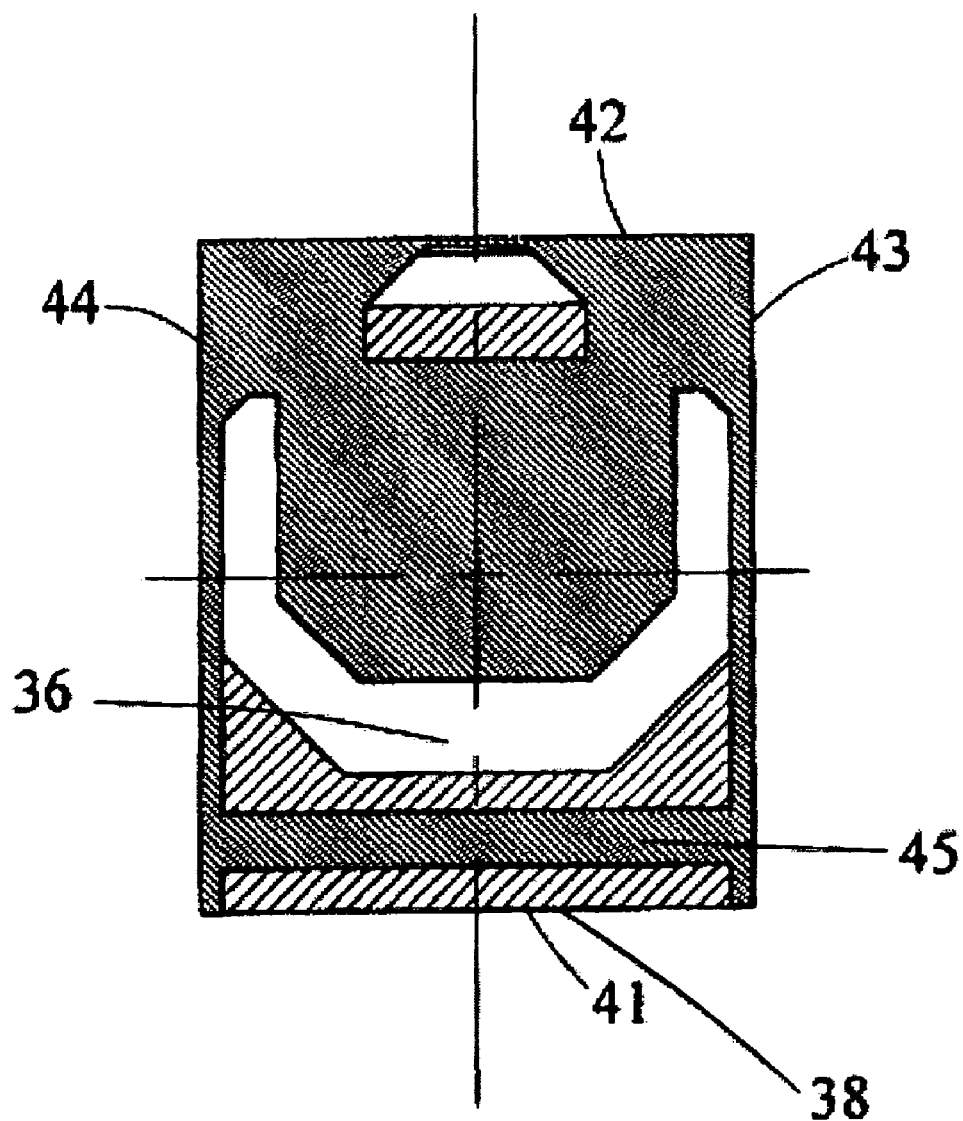
FIG. 13 is a diagram showing the configuration of an air bearing surface 30G.
Figure 14:
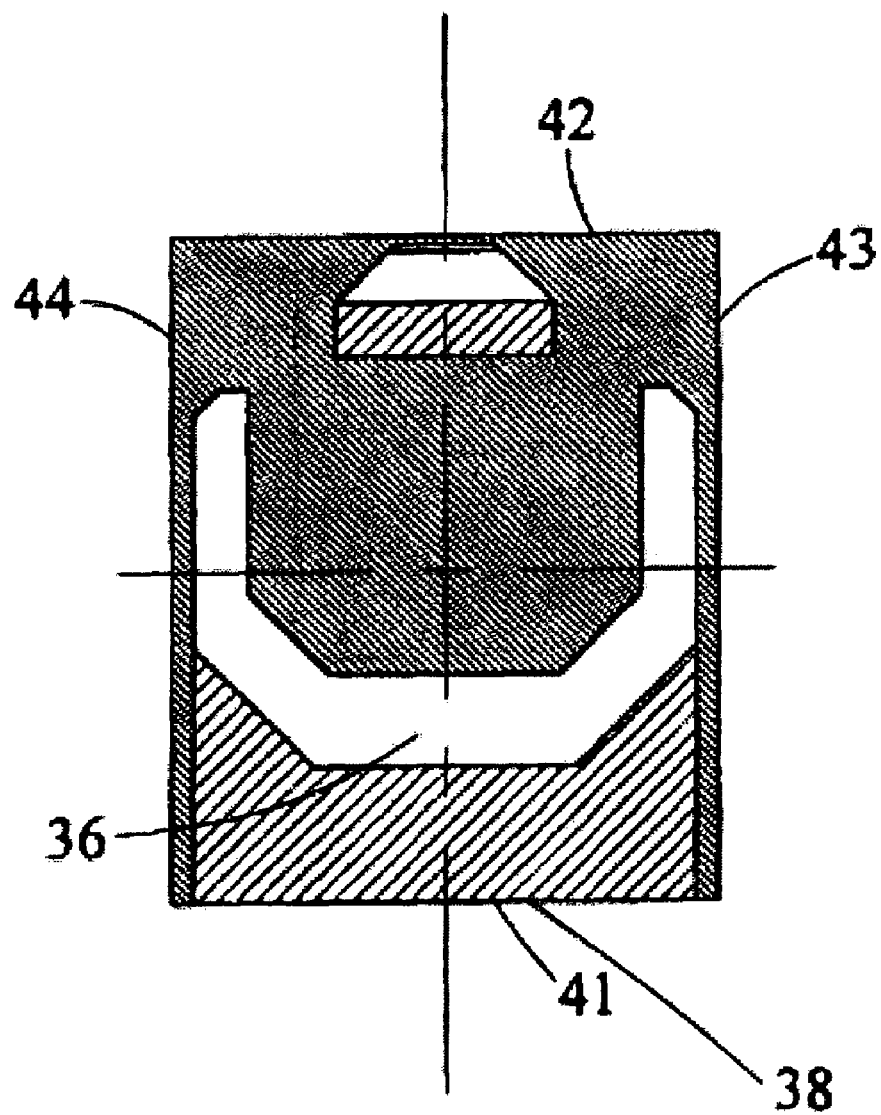
FIG. 14 is a diagram showing the configuration of an air bearing surface 30H.

FIG. 10 shows the mean values of the atmospheric pressure variation characteristic at four positions on the disk between ID 11 and OD 12 with respect to the rotational speed and the relative speed between the slider and the disk plotted along the abscissa. The four positions are ID 11, OD 12, MD 13, and a position of a radius of 6 mm between ID 11 and MD 13. As the relative speed, the relative speed at the MD 13 position is shown. In FIG. 10, symbol ● indicates the case where the groove configuration surface 45 is formed, and symbol ● indicates the case where the groove configuration surface 45 is not formed. The slider 3 used at each of different rotational speeds actually has different distributions of pressure acting on the air bearing surface with respect to different relative speeds between the slider and the disk. Therefore, there is a need to optimize the air bearing surface configuration according to the relative speeds. In this embodiment, to enable the influence of the relative speed on the atmospheric pressure variation characteristic to be easily understood, only the cross rail 36 formation position and the depth of the lower stage surface 33 are optimized without largely changing the air bearing surface. The results at 3600 rpm are the above-described results with respect to the air bearing surface 30A and the air bearing surface 30B. FIGS. 11 and 12 show air bearing surfaces 30E and 30F used with respect to 7200 rpm, and FIGS. 13 and 14 show air bearing surfaces 30G and 30H used at 10800 rpm. The difference in level of the lower stage surface 33 with respect to 7200 rpm is 800 nm, while the difference in level of the lower stage surface 33 at 10800 rpm is 900 nm. The relative speed on an MD in a magnetic disk device in accordance with 65 mm disk diameter and 4200 rpm specifications, cited here for reference sake, is about 10 m/s and is approximately equal to the relative speed with respect to 10800 rpm in this embodiment. It can be understood from FIG. 10 that in the case where the groove configuration surface 45 is not provided (air bearing surfaces 30B, 30F, and 30H), the atmospheric pressure variation characteristic in the region where the relative speed is 7 m/s or lower is 80% or less, and that in the case where the groove configuration surface 45 is provided (air bearing surfaces 30A, 30E, and 30G), the 80% or higher atmospheric pressure variation characteristic can be ensured even in the region where the relative speed is 7 m/s or lower.

It can be understood that it is very difficult to ensure the sufficient air inflow to the air bearing surface in the comparatively-low-speed region in which the air flow velocity is 7 m/s is lower in the slider based on the conventional air bearing surface design method, and that there is a need to ensure the desired air inflow amount by forming the groove configuration surface 45 in accordance with the present invention in order to ensure the desired atmospheric pressure variation characteristic.

Also, these results truly show that the atmospheric pressure variation characteristic is deteriorated by a reduction in relative speed, because the atmospheric pressure variation characteristics with respect to 7200 rpm and 10800 rpm are better than that with respect to 3600 rpm, although a restriction is imposed to avoid largely changing the air bearing surface configuration to enable explicit comparison with the characteristic with respect to 3600 rpm. This also makes clear that it is difficult to ensure the desired atmospheric pressure variation characteristic in a region where the air inflow amount is comparatively small, and demonstrates that it is possible to increase the air inflow amount and to improve the atmospheric pressure variation characteristic by forming the groove configuration surface 45 in accordance with the present invention.

Further, these result show that the atmospheric pressure variation characteristic can be improved in the region where the relative speed is 10 m/s or lower by providing the groove configuration surface 45, and it can be understood that while an atmospheric pressure variation characteristic of 80% or higher is set as a condition in this embodiment, the formation of the groove configuration surface 45 according to the present invention is effect in the region where the relative speed is 10 m/s or lower, for example, in a future case where a further improvement in the atmospheric pressure variation characteristic is required.

Figure 15:
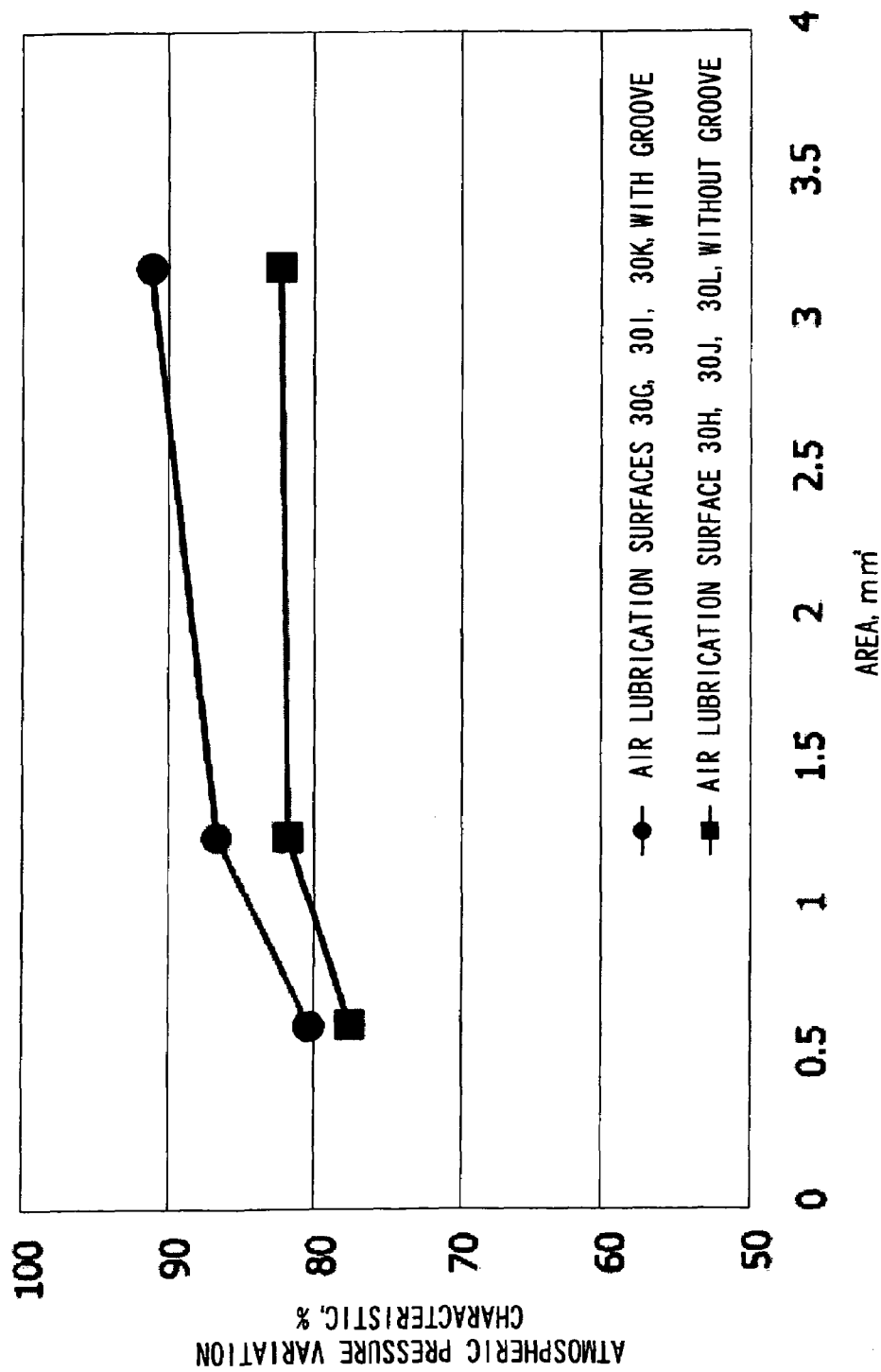
FIG. 15 is a diagram showing the relationship between the air bearing surface area and the atmospheric pressure variation characteristic.
Figure 16:
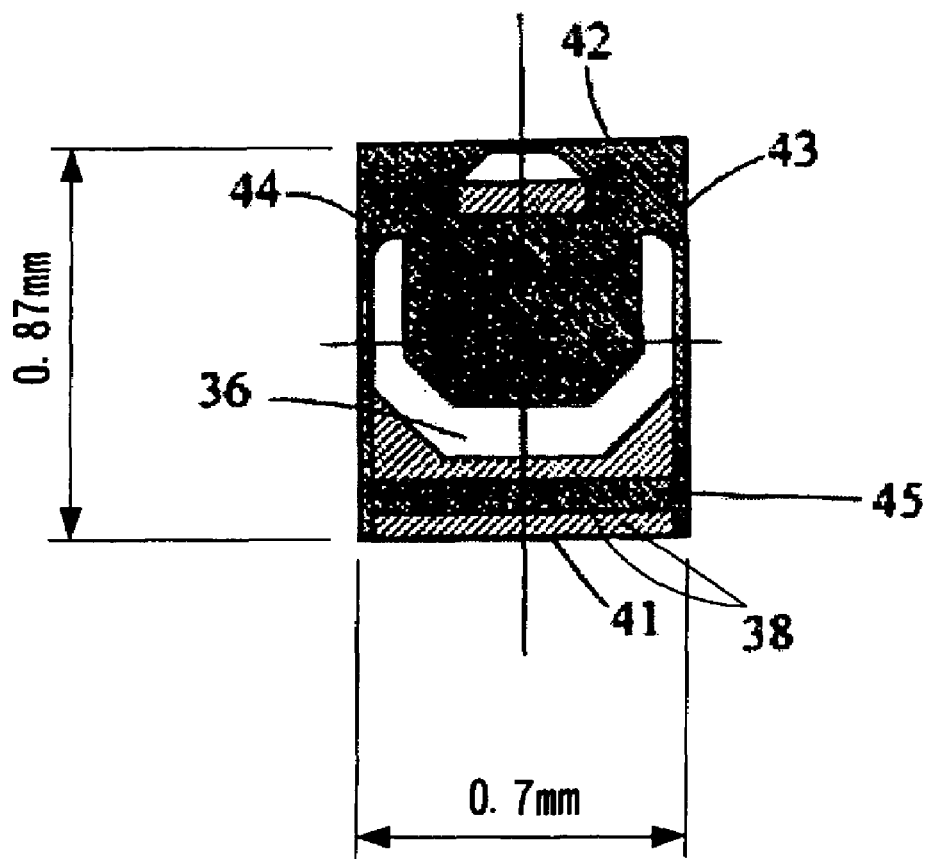
FIG. 16 is a diagram showing the configuration of an air bearing surface 30I.
Figure 17:
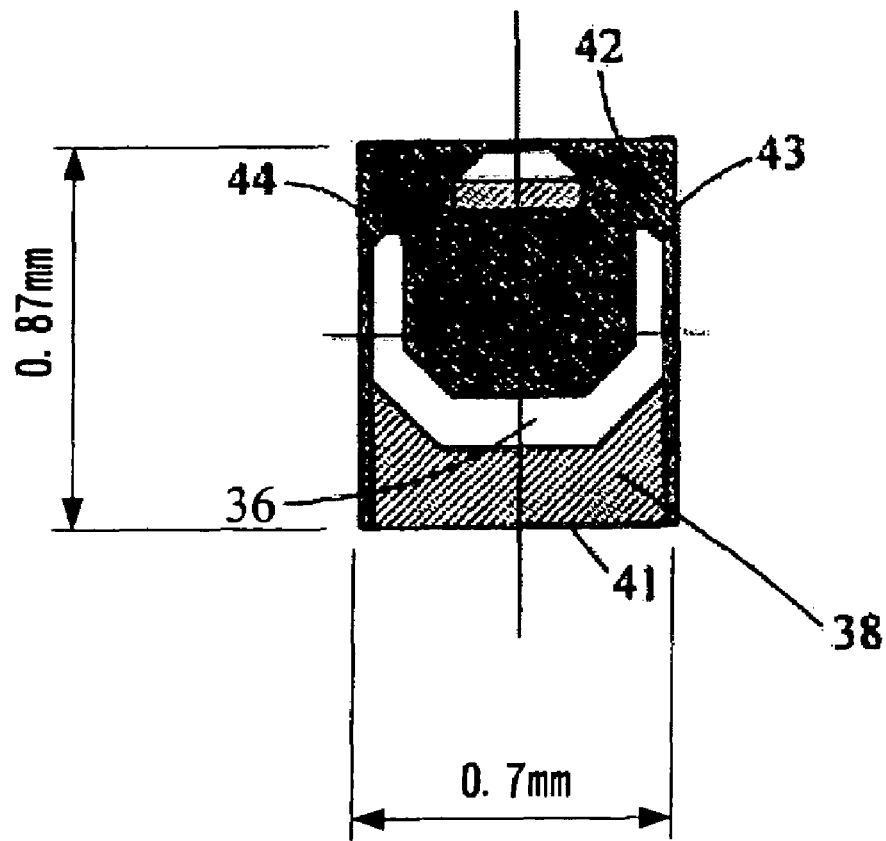
FIG. 17 is a diagram showing the configuration of an air bearing surface 30J.
Figure 18:
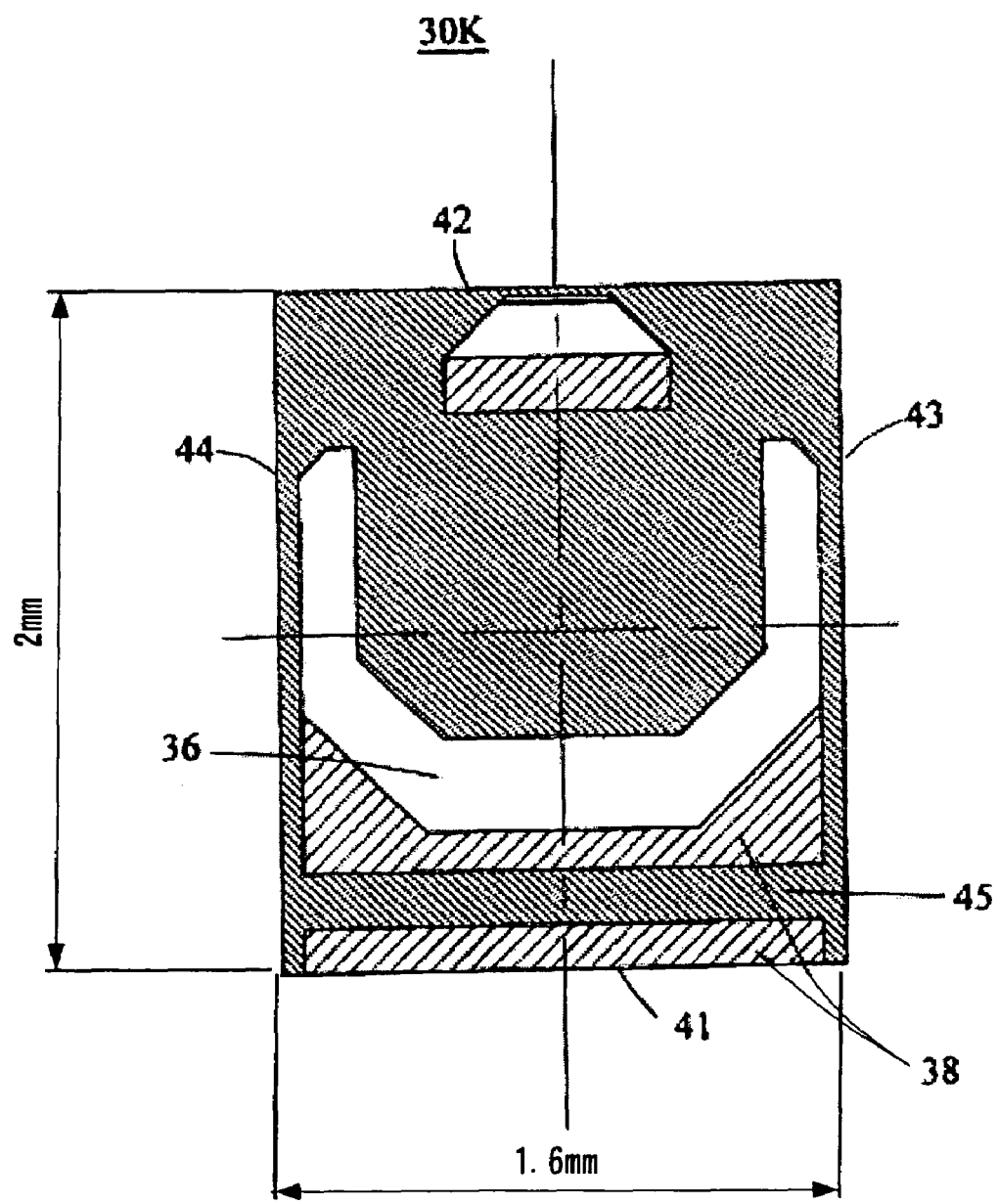
FIG. 18 is a diagram showing the configuration of an air bearing surface 30K.
Figure 19:
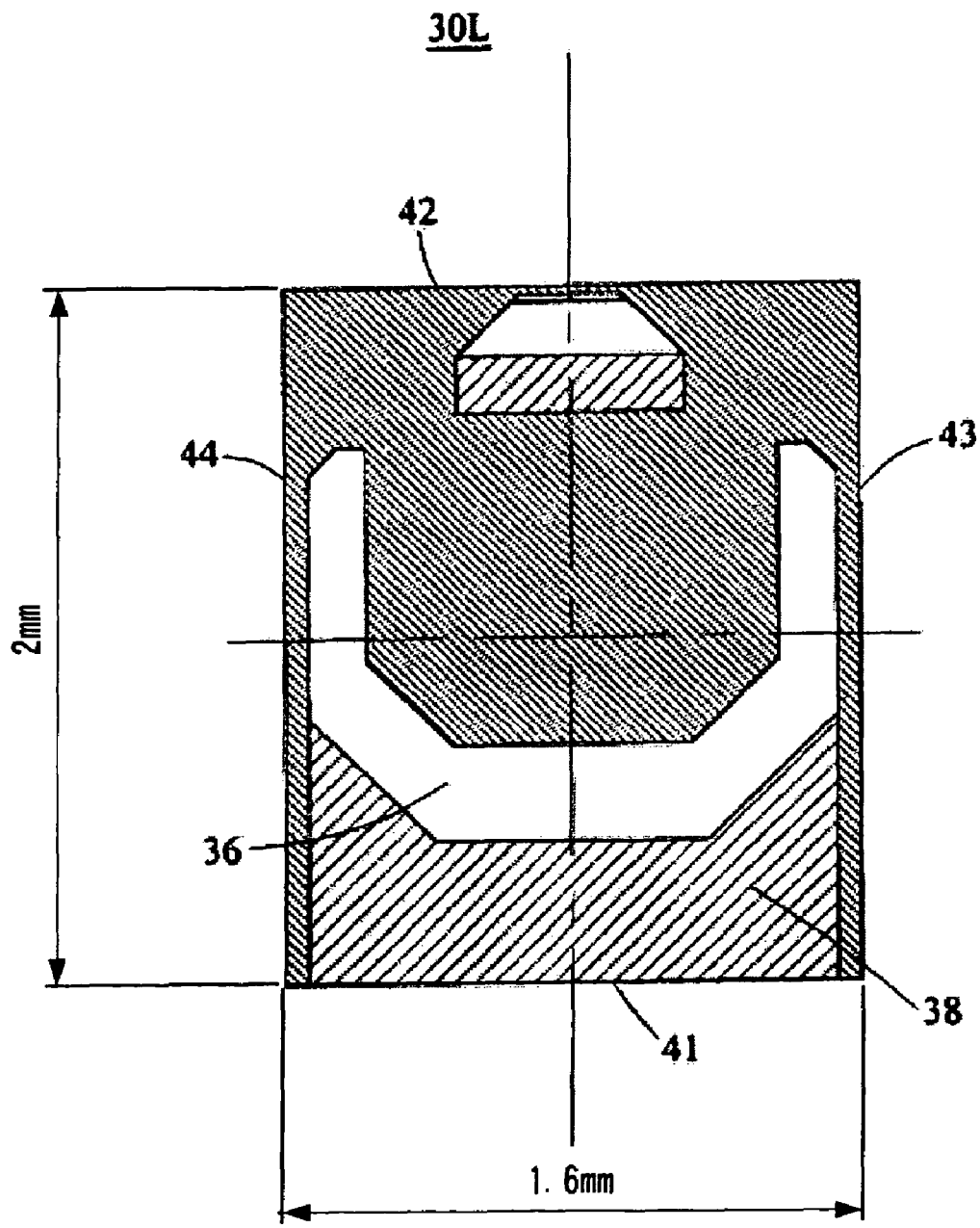
FIG. 19 is a diagram showing the configuration of an air bearing surface 30L.
Figure 21:
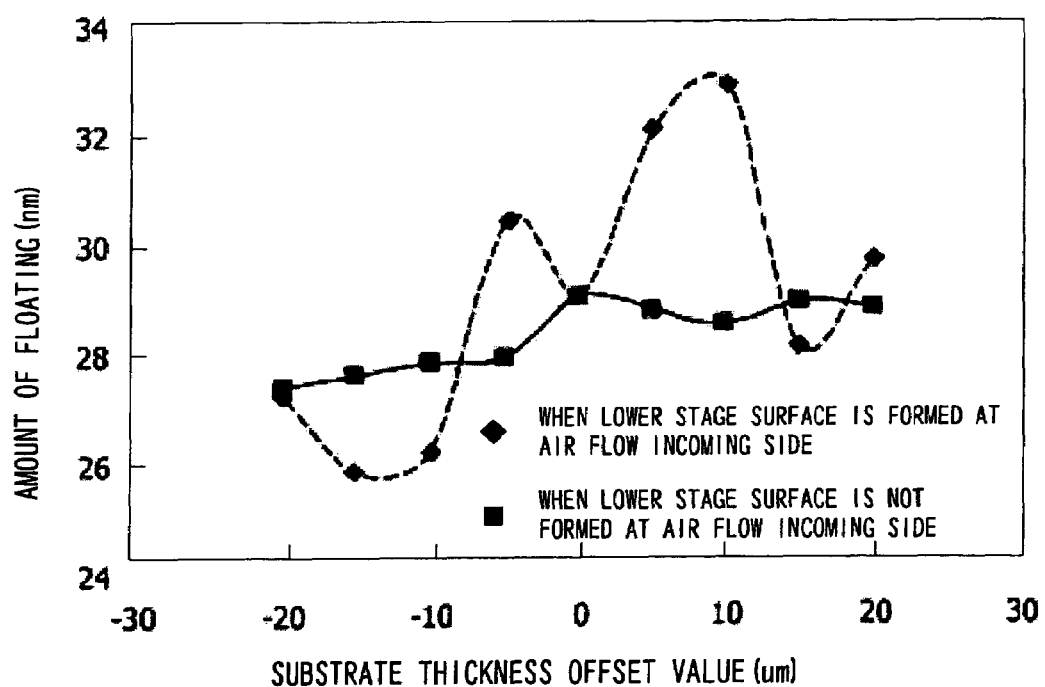
FIG. 21 is a diagram showing changes in the amount of floating dependent on variation in the slider length.

FIG. 15 shows the relationship between the area of the air bearing surface and the atmospheric pressure variation characteristic indicated by symbol ● in the case where the groove configuration surface 45 is formed, and the corresponding relationship indicated by symbol ■ in the case where the groove configuration surface 45 is not formed. As an evaluation condition, the rotational speed of the disk 2 was set to 10800 rpm to assume the relative speed in the magnetic disk device using a disk having a diameter of 65 mm presently used generally. Evaluations were made using as the area of the air bearing surface of the slider 3 three sizes: the 1 mm×1.25 mm=1.25 mm$^2$ size of so-called pico-slider, the size of a nano-slider (1.6×2 mm) generally used in the preceding generation, and the size of a femto-slider (0.7×0.87 mm) presently under development, which is supposed to be a next-generation one. The results with respect to the pico-slider are the results with respect to the air bearing surfaces 30G and 30H shown in FIGS. 13 and 14. FIG. 16 shows an air bearing surface 30I in a case where the groove configuration surface 45 is provided in the femto-slider. FIG. 17 shows an air bearing surface 30J in a case where the groove configuration surface 45 is not provided in the femto-slider. FIG. 18 shows an air bearing surface 30K in a case where the groove configuration surface 45 is provided in the nano-slider. FIG. 19 shows an air bearing surface 30L in a case where the groove configuration surface 45 is not provided in the nano-slider. The configurations in plan of the air bearing surfaces 30I to 30L are obtained by scaling up/down the air bearing surfaces 30G and 30H according to the air bearing surface area. Only the difference in level of the lower stage surface 33 is changed. The difference in level of the lower stage surfaces 33 in the air bearing surfaces 30I and 30J is 600 nm, and the difference in level of the lower stage surfaces 33 in the air bearing surfaces 30K and 30L is 1200 nm. It can be understood from FIG. 15 that in either of the case where the groove configuration surface 45 is formed (symbol 0) and the case where the groove configuration surface 45 is not formed (symbol ■), the atmospheric pressure variation characteristic is deteriorated if the area of the air bearing surface is reduced. However, it can be understood that while the 80% or higher atmospheric pressure variation characteristic is ensured with respect to the entire surface in the case where the groove configuration surface 45 is formed, the atmospheric pressure variation characteristic is 80% or less with respect to the area of the femto-slider in the case where the groove configuration surface 45 is not formed. It can be understood from FIG. 15 that the atmospheric pressure variation characteristic is 80% or less in the region in terms of area where the area is about 1 mm$^2$ or less. Also from this phenomenon, it is made clear that there is a need to ensure the desired amount of air inflow to the air bearing surface in order to ensure the desired atmospheric pressure variation characteristic. Also from this result, it is made clear that in the case of the slider based on the conventional air bearing surface design method the 80% or higher atmospheric pressure variation characteristic cannot be ensured with respect to the region where the area is 1 mm$^2$ or less even in the region corresponding to the relative speed between the slider 3 and the disk 2 presently used generally, and that there is a need to ensure the desired air inflow amount by forming the groove configuration surface 45 in accordance with the present invention in order to ensure the desired atmospheric pressure variation characteristic. Further, as can be understood from this embodiment, it is desirable that the area of the air bearing surface of the slider be 0.5 mm$^2$ or more in ensuring the 80% or higher atmospheric pressure variation characteristic by providing the groove configuration surface 45 in accordance with the present invention.

Figure 23:
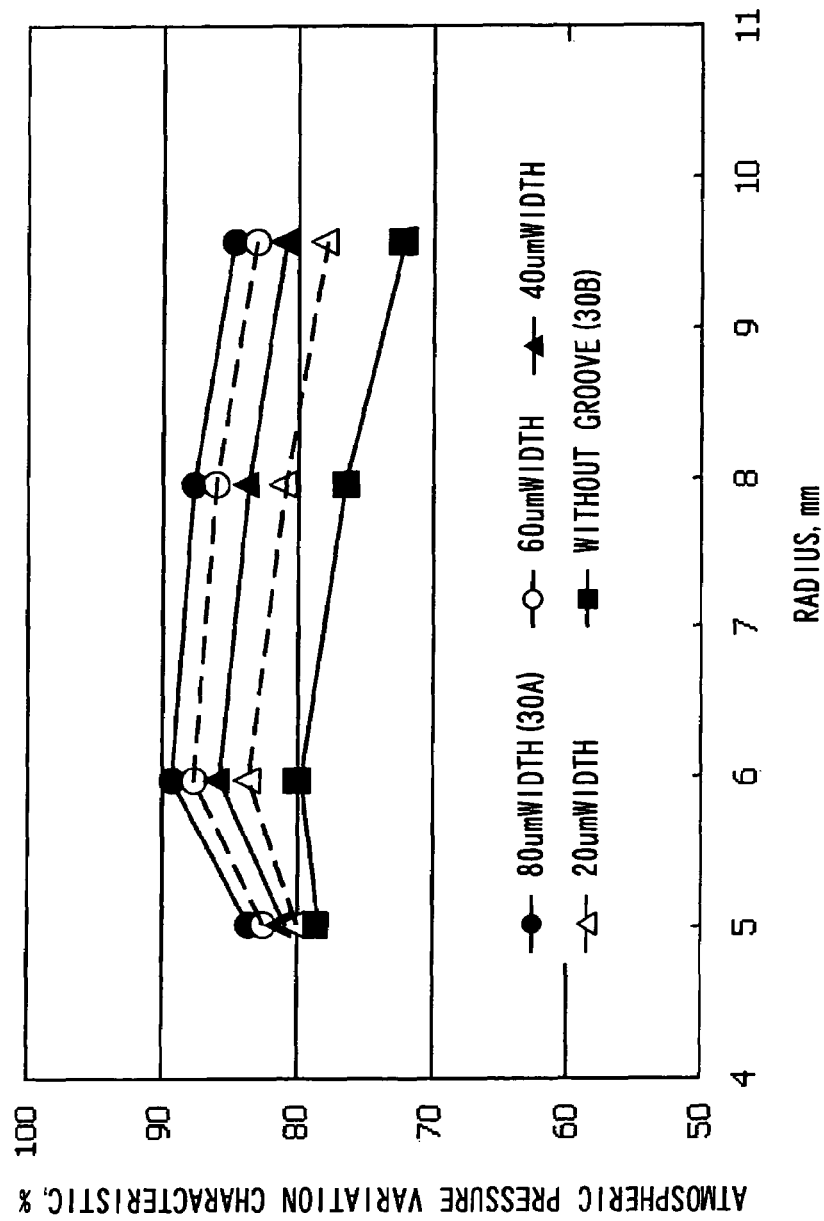
FIG. 23 is a diagram showing the relationship between the width of a groove configuration surface and the atmospheric pressure variation characteristic.

Improvements in atmospheric pressure variation characteristic achieved by using the air bearing surfaces 30A to 30L and forming the groove configuration surface have been described. FIG. 23 shows the relationship between the groove width of the groove configuration surface 45 formed in the air bearing surface and the atmospheric pressure variation characteristic.

Figure 24:
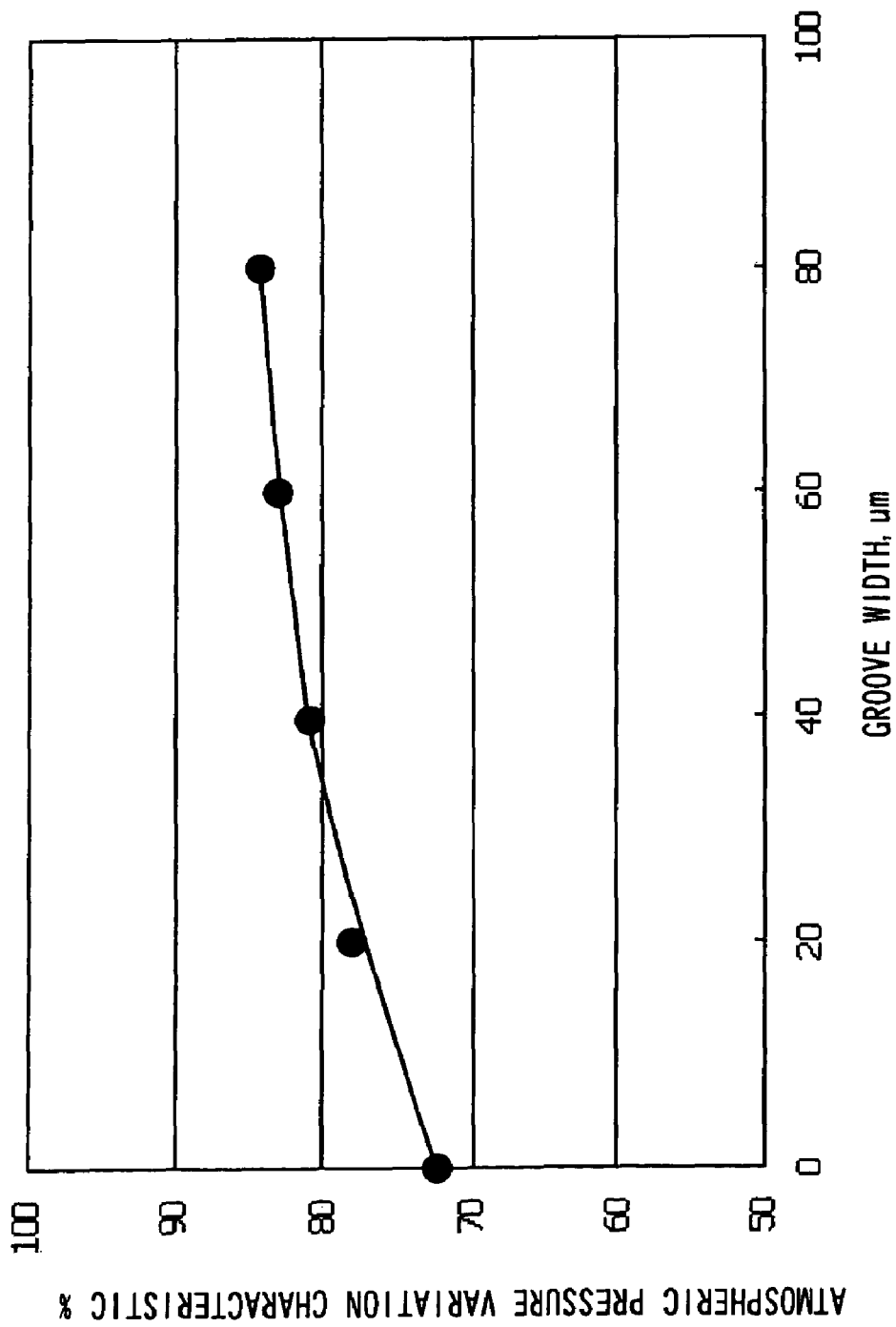
FIG. 24 is a diagram showing the relationship between the width of the groove configuration surface and the atmospheric pressure variation characteristic at OD.

In FIG. 23, the abscissa represents the radius position and the ordinate represents the atmospheric pressure variation characteristic in a case where the groove width of the air bearing surface 30A shown as FIG. 4 is reduced in steps of 20 um. It can be understood that the influence of the groove width on the atmospheric pressure characteristic is maximized at OD, in FIG. 23. FIG. 24 shows the relationship between the groove width and the atmospheric pressure characteristic at OD to be taken into consideration from the results shown in FIG. 23. In FIG. 24, the abscissa represents the groove width and the ordinate represents the atmospheric pressure variation characteristic at OD. It can be understood from FIG. 24 that it is desirable to set the groove width to 30 um or more in forming in order to ensure the 80% or higher atmospheric pressure variation characteristic. If there is a need to work the air bearing surface by using a resist for dry etching or the like as in this embodiment, it is desirable to ensure that the width of the groove configuration surface is 30 um or more, also from the viewpoint of the accuracy of working of the air bearing surface dependent on the resist film thickness.

Further, it is desirable to design the groove configuration surface by setting the groove configuration surface at a distance of 20 um or more from the air flow incoming end in order to avoid extension of the groove configuration surface to the air flow incoming end even in a case where there is variation in the slider length dependent on the wafer thickness.

While in this embodiment the groove configuration surface is formed in slit form parallel to the transverse axis of the slider, any other configuration of the groove configuration surface may suffice as long as the sufficient air inflow amount can be ensured without being influenced by variation in slider length. Needless to say, it is not necessarily to form the groove configuration surface parallel to the transverse axis of the slider. Also, needless to say, the configuration of the groove configuration surface is not limited to the slit form.

The embodiment of the slider in accordance with the present invention has been described. If a disk device is constructed by using the slider constructed as described above, it can be provided as a disk device suitable for use on high ground.

While the embodiment has been conceived as a magnetic disk device, it is not limited to the magnetic disk device. For example, the same effect can also be obtained even in a case where the head is an optical head and the disk device is an optical disk device.

INDUSTRIAL APPLICABILITY

The slider provided by the present invention to achieve the above-described object is a negative pressure utilization type of slider having a head for performing recording on a disk or reproducing from the disk, and an air bearing surface 30A formed in a surface facing the disk by a plurality of generally flat surfaces for floating from the disk medium by an air flow caused by the rotation of the disk, the generally flat surfaces differing in height from each other, an air inflow surface 38, a positive pressure generating surface 36 and a negative pressure generating surface 37 being formed in the air bearing surface 30A from the air flow incoming side, wherein a groove configuration surface 45 lower in height than the air inflow surface 38 is formed in the air inflow surface 38 from the disk inner peripheral end 43 side to the disk outer peripheral end 44 side of the air inflow surface. According to the present invention, the advantageous effect of enabling designing a slider having reduced changes in the amount of floating due to unevenness of working on the slider, with respect to changes in atmospheric pressure, while limiting the changes in the amount of floating, can be obtained.

The invention claimed is:

1. A negative pressure utilization type of slider comprising:
a head for recording onto a disk or reproducing from a disk; and
an air bearing surface for facing such a disk, said air bearing surface comprising a plurality of substantially flat surfaces, said substantially flat surfaces differing in height from each other, for generating an air flow when such disk rotates, thereby causing the slider to float over such disk,
the air bearing surface having three stages comprising an air inflow surface, a positive pressure generating surface and a negative pressure generating surface, respectively, in order, from an air flow incoming end to an air flow outgoing end of the slider,
wherein the air inflow surface extends to the air flow incoming end,
the air inflow surface has a groove extending between, and including, a disk inner peripheral end and a disk outer peripheral end of the air inflow surface, a bottom surface of the groove being lower in height than the air inflow surface relative to a surface opposite the disk-facing surface, the groove being parallel to and set back from the air flow incoming end, such that it does not contact an edge of the air flow incoming end, and
the three stages of the air bearing surface differing in height, the three stages comprising an upper stage surface highest in height, a lower stage surface lowest in height and a middle surface lower than the upper stage surface and higher than the lower stage surface, the positive pressure generating surface, the air inflow surface and the negative pressure generating surface being formed on the upper stage surface, the middle surface and the lower stage surface, respectively.

2. The slider according to claim 1, wherein the bottom surface of the groove is flush with, and the same height as, the negative pressure generating surface.

3. The slider according to claim 1, wherein the groove is located at least 20 um from the air flow incoming end.

4. The slider according to claim 1, wherein the groove has a width of at least 30 um.

5. The slider according to claim 1, wherein the head is a magnetic head.

6. The slider according to claim 1, wherein the head comprises a magnetoresistive element.

7. The slider according to claim 1, wherein the air bearing surface has an area of not more than 1 $mm^2$.

8. The slider according to claim 1, wherein the air bearing surface has an area of not less than 0.5 $mm^2$.

9. A disk device for operating with an information bearing disk, said disk device including a slider according to claim 1.

10. The disk device according to claim 9, further including means for recording, reproducing, or both recording and reproducing in a disk region where a relative speed between the slider and a disk is not higher than 10 m/s.

11. The disk device according to claim 9, further including means for recording, reproducing or both recording and reproducing in a disk region where a relative speed between the slider and a disk is not higher than 7 m/s.

12. A negative pressure utilization type of slider comprising:
a head for recording onto a disk or reproducing from a disk; and
an air bearing surface for facing such a disk, the air bearing surface comprising a plurality of substantially flat surfaces, said substantially flat surfaces differing in height from each other, for generating an air flow when such disk rotates, thereby causing the slider to float over such disk,
the air bearing surface having three stages comprising an air inflow surface, a positive pressure generating surface, and a negative pressure generating surface, respectively, in order from an air flow incoming end to an air flow outgoing end of the slider,
wherein the air inflow surface extends to the air flow incoming end,
the air inflow surface has a groove extending from and including a disk inner peripheral end toward a disk outer peripheral end of the air inflow surface, a bottom surface of the groove being lower in height than the air inflow surface relative to a surface opposite the disk-facing surface, the groove being parallel to and set back from the air flow incoming end, such that it does not contact an edge of the air flow incoming end, and
the three stages of the air bearing surface differing in height, the three stages comprising an upper stage surface highest in height, a lower stage surface lowest in height and a middle surface lower than the upper stage surface and higher than the lower stage surface, the positive pressure generating surface, the air inflow surface and the negative pressure generating surface being formed on the upper stage surface, the middle surface and the lower stage surface, respectively.

13. The slider according to claim 12, wherein the bottom surface of the groove is flush with, and the same height as, the negative pressure generating surface.

14. The slider according to claim 12, wherein the groove is located at least 20 um from the air flow incoming end.

15. The slider according to claim 12, wherein the groove c has a width of at least 30 um.

16. The slider according to claim 12, wherein the head is a magnetic head.

17. The slider according to claim 12, wherein the head comprises a magnetoresistive element.

18. The slider according to claim 12, wherein the air bearing surface has an area of not more than 1 mm$^2$.

19. The slider according to claim 12, wherein the air bearing surface has an area of not less than 0.5 mm$^2$.

20. A disk device for operating with an information bearing disk, said disk device including a slider according to claim 12.

21. The disk device according to claim 20, further including means for recording, reproducing or both recording and reproducing in a disk region where a relative speed between the slider and a disk is not higher than 10 m/s.

22. The disk device according to claim 20, further including means for recording, reproducing or both recording and reproducing in a disk region where a relative speed between the slider and a disk is not higher than 7 m/s.

23. A negative pressure utilization type of slider comprising:
   a head for recording onto a disk or reproducing from a disk; and
   an air bearing surface for facing such a disk, the air bearing surface comprising a plurality of substantially flat surfaces, said substantially flat surfaces differing in height from each other, for generating an air flow when such disk rotates, thereby causing the slider to float over such disk,
   the air bearing surface having three stages comprising an air inflow surface, a positive pressure generating surface, and a negative pressure generating surface, respectively, in order, from an air flow incoming end to an air flow outgoing end of the slider,
   wherein the air inflow surface extends to the air flow incoming end,
   the air inflow surface has a groove extending from and including a disk outer peripheral end toward a disk inner peripheral end of the air inflow surface, a bottom surface of the groove being lower in height than the air inflow surface relative to a surface opposite the disk-facing surface, the groove being parallel to and set back from the air flow incoming end, such that it does not contact an edge of the air flow incoming end, and
   the three stages of the air bearing surface differing in height, the three stages comprising an upper stage surface highest in height, a lower stage surface lowest in height and a middle surface lower than the upper stage surface and higher than the lower stage surface, the positive pressure generating surface, the air inflow surface and the negative pressure generating surface being formed on the upper stage surface, the middle surface and the lower stage surface, respectively.

24. The slider according to claim 23, wherein the bottom surface of the groove is flush with, and the same height as, the negative pressure generating surface.

25. The slider according to claim 23, wherein the groove is located at least 20 um from the air flow incoming end.

26. The slider according to claim 23, wherein the groove has a width of at least 30 um.

27. The slider according to claim 23, wherein the head is a magnetic head.

28. The slider according to claim 23, wherein the head comprises a magnetoresistive element.

29. The slider according to claim 23, wherein the air bearing surface has an area of not more than 1 mm$^2$.

30. The slider according to claim 23, wherein the air bearing surface has an area of not less than 0.5 mm$^2$.

31. A disk device for operating with an information bearing disk, said disk device including a slider according to claim 23.

32. The disk device according to claim 31, further including means for recording, reproducing or both recording and reproducing in a disk region where a relative speed between the slider and a disk is not higher than 10 m/s.

33. The disk device according to claim 31, further including means for recording, reproducing or both recording and reproducing in a disk region where a relative speed between the slider and a disk is not higher than 7 m/s.

* * * * *